(12) United States Patent
Alpaslan et al.

(10) Patent No.: US 11,051,039 B2
(45) Date of Patent: *Jun. 29, 2021

(54) METHODS FOR FULL PARALLAX LIGHT FIELD COMPRESSION

(71) Applicant: Ostendo Technologies, Inc., Carlsbad, CA (US)

(72) Inventors: Zahir Y. Alpaslan, San Marcos, CA (US); Song Cen, San Diego, CA (US); Wankai Liu, Fujian (CN); Rie Matsubara, Encinitas, CA (US); Hussein S. El-Ghoroury, Carlsbad, CA (US); Dale A. McNeill, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 15/994,870

(22) Filed: May 31, 2018

(65) Prior Publication Data

US 2018/0352254 A1 Dec. 6, 2018

Related U.S. Application Data

(60) Provisional application No. 62/514,708, filed on Jun. 2, 2017.

(51) Int. Cl.
*H04N 19/597* (2014.01)
*H04N 13/178* (2018.01)
(Continued)

(52) U.S. Cl.
CPC ......... *H04N 19/597* (2014.11); *H04N 13/161* (2018.05); *H04N 13/178* (2018.05);
(Continued)

(58) Field of Classification Search
CPC .. H04N 19/597; H04N 13/161; H04N 13/232; H04N 13/268; H04N 13/178;
(Continued)

(56) References Cited

U.S. PATENT DOCUMENTS

| 5,613,048 A | 3/1997 | Chen et al. |
| 6,009,188 A | 12/1999 | Cohen et al. |

(Continued)

FOREIGN PATENT DOCUMENTS

| TW | 201904279 A | 1/2019 |
| WO | 2016172384 A1 | 10/2016 |
| WO | 2019199854 A1 | 10/2019 |

OTHER PUBLICATIONS

"International Search Report and Written Opinion of the International Searching Authority dated Sep. 10, 2018; International Application No. PCT/US2018/035730", Sep. 10, 2018.

(Continued)

*Primary Examiner* — Siamak Harandi
(74) *Attorney, Agent, or Firm* — Elliott, Ostrander & Preston, P.C.

(57) ABSTRACT

Methods and systems for image encoding and decoding are disclosed. According to some embodiments, scene metadata and input images associated with a scene are received. A first encoding operation is performed on the scene metadata and input images to generate reference images and reference disparity information. A second encoding operation is performed on the reference images and reference disparity information to output encoded data. The encoded data includes encoded reference images and encoded reference disparity information. The encoded data is transmitted.

17 Claims, 16 Drawing Sheets

(51) Int. Cl.
| | | |
|---|---|---|
| *H04N 21/81* | (2011.01) | |
| *H04N 13/268* | (2018.01) | |
| *H04N 13/232* | (2018.01) | |
| *H04N 13/161* | (2018.01) | |
| *H04N 19/105* | (2014.01) | |
| *H04N 19/30* | (2014.01) | |
| *H04N 19/44* | (2014.01) | |
| *H04N 19/46* | (2014.01) | |

(52) U.S. Cl.
CPC ......... *H04N 13/232* (2018.05); *H04N 13/268* (2018.05); *H04N 19/105* (2014.11); *H04N 19/30* (2014.11); *H04N 19/44* (2014.11); *H04N 19/46* (2014.11); *H04N 21/8133* (2013.01); *H04N 21/816* (2013.01)

(58) Field of Classification Search
CPC .... H04N 21/8133; H04N 19/46; H04N 19/44; H04N 19/30; H04N 19/105; H04N 21/816
See application file for complete search history.

(56) References Cited

U.S. PATENT DOCUMENTS

| | | |
|---|---|---|
| 6,097,394 A | 8/2000 | Levoy et al. |
| 6,738,533 B1 | 5/2004 | Shum et al. |
| 6,963,431 B2 | 11/2005 | Holzbach et al. |
| 7,623,560 B2 | 11/2009 | El-Ghoroury et al. |
| 7,767,479 B2 | 8/2010 | El-Ghoroury et al. |
| 7,829,902 B2 | 11/2010 | El-Ghoroury et al. |
| 7,856,149 B2 | 12/2010 | Govindaswamy et al. |
| 7,978,407 B1 | 7/2011 | Connor |
| 8,049,231 B2 | 11/2011 | El-Ghoroury et al. |
| 8,243,770 B2 | 8/2012 | El-Ghoroury et al. |
| 8,284,237 B2 | 10/2012 | Chen et al. |
| 8,401,316 B2 | 3/2013 | Babacan et al. |
| 8,567,960 B2 | 10/2013 | El-Ghoroury et al. |
| 8,681,185 B2 | 3/2014 | Guncer |
| 8,854,724 B2 | 10/2014 | El-Ghoroury et al. |
| 8,928,969 B2 | 1/2015 | Alpaslan et al. |
| 8,970,646 B2 | 3/2015 | Guncer |
| 9,179,126 B2 | 11/2015 | El-Ghoroury et al. |
| 9,195,053 B2 | 11/2015 | El-Ghoroury et al. |
| 9,414,087 B2 | 8/2016 | Akeley et al. |
| 9,462,164 B2 | 10/2016 | Venkataraman et al. |
| 9,681,069 B2 | 6/2017 | El-Ghoroury et al. |
| 9,712,764 B2 | 7/2017 | El-Ghoroury et al. |
| 9,774,800 B2 | 9/2017 | El-Ghoroury et al. |
| 9,779,515 B2 | 10/2017 | El-Ghoroury et al. |
| 2002/0067521 A1 | 6/2002 | Holzbach et al. |
| 2008/0043095 A1 | 2/2008 | Vetro et al. |
| 2008/0198920 A1 | 8/2008 | Yang et al. |
| 2009/0086170 A1 | 4/2009 | El-Ghoroury et al. |
| 2009/0278998 A1 | 11/2009 | El-Ghoroury et al. |
| 2010/0003777 A1 | 1/2010 | El-Ghoroury et al. |
| 2010/0007804 A1 | 1/2010 | Guncer |
| 2010/0066921 A1 | 3/2010 | El-Ghoroury et al. |
| 2010/0156894 A1 | 6/2010 | Holler et al. |
| 2010/0220042 A1 | 9/2010 | El-Ghoroury et al. |
| 2010/0225679 A1 | 9/2010 | Guncer |
| 2010/0231585 A1 | 9/2010 | Weiblen |
| 2010/0271511 A1 | 10/2010 | Ma et al. |
| 2011/0058021 A1 | 3/2011 | Chen et al. |
| 2011/0134227 A1 | 6/2011 | Shin |
| 2012/0033113 A1 | 2/2012 | El-Ghoroury et al. |
| 2012/0183232 A1 | 7/2012 | Babacan et al. |
| 2012/0213270 A1 | 8/2012 | Baraniuk et al. |
| 2012/0249750 A1 | 10/2012 | Izzat et al. |
| 2012/0293635 A1 | 11/2012 | Sharma et al. |
| 2013/0010057 A1 | 1/2013 | Borel et al. |
| 2013/0077880 A1 | 3/2013 | Venkataraman et al. |
| 2013/0077882 A1 | 3/2013 | Venkataraman et al. |
| 2013/0082905 A1 | 4/2013 | Ranieri et al. |
| 2013/0141895 A1 | 6/2013 | Alpaslan et al. |
| 2013/0258451 A1 | 10/2013 | El-Ghoroury et al. |
| 2013/0294504 A1 | 11/2013 | Mishourovsky et al. |
| 2013/0321581 A1 | 12/2013 | El-Ghoroury et al. |
| 2014/0085417 A1 | 3/2014 | Shi et al. |
| 2014/0232822 A1 | 8/2014 | Venkataraman et al. |
| 2014/0347361 A1 | 11/2014 | Alpaslan et al. |
| 2015/0015669 A1 | 1/2015 | Venkataraman et al. |
| 2015/0033539 A1 | 2/2015 | El-Ghoroury et al. |
| 2015/0199794 A1 | 7/2015 | Venkataraman et al. |
| 2015/0201176 A1 | 7/2015 | Graziosi et al. |
| 2016/0021355 A1 | 1/2016 | Alpaslan et al. |
| 2016/0028935 A1 | 1/2016 | El-Ghoroury et al. |
| 2016/0100198 A1 | 4/2016 | Matsui et al. |
| 2016/0142615 A1 | 5/2016 | Liang et al. |
| 2016/0182782 A1 | 6/2016 | El-Ghoroury et al. |
| 2016/0191765 A1 | 6/2016 | El-Ghoroury et al. |
| 2016/0191823 A1 | 6/2016 | El-Ghoroury et al. |
| 2016/0357147 A1 | 12/2016 | Falkenberg et al. |
| 2016/0360177 A1 | 12/2016 | Graziosi et al. |
| 2017/0070751 A1 | 3/2017 | Shimizu et al. |
| 2017/0142427 A1 | 5/2017 | Graziosi et al. |
| 2017/0236295 A1 | 8/2017 | El-Ghoroury et al. |
| 2017/0257649 A1* | 9/2017 | Bourouihiya ...... H04N 21/2347 |
| 2018/0097867 A1 | 4/2018 | Pang et al. |
| 2018/0350038 A1 | 12/2018 | Cen et al. |
| 2018/0352254 A1 | 12/2018 | Alpaslan et al. |
| 2018/0359489 A1 | 12/2018 | Lakshman et al. |
| 2019/0068973 A1 | 2/2019 | Hamilton et al. |
| 2019/0158877 A1 | 5/2019 | Thoreau et al. |
| 2019/0320186 A1 | 10/2019 | Liu et al. |
| 2019/0394488 A1 | 12/2019 | Alpaslan et al. |
| 2020/0036988 A1 | 1/2020 | Graziosi et al. |

OTHER PUBLICATIONS

Alpaslan, Zahir Y. et al., "Development and Deployment of a Tiled Full Parallax Light Field Display System", Proceedings of the SPIE, Applications of Digital Image Processing XXXIX, vol. 9971, Sep. 27, 2016, pp. 99710J-1 to 99710J-8.

Alpaslan, Zahir Y. et al., "Parametric Characterization of Perceived Light Field Display Resolution", SID Symposium Digest of Technical Papers, vol. 47, No. 1, May 2016, pp. 1241-1245.

Alpaslan, Zahir Y. et al., "Small Form Factor Full Parallax Tiled Light Field Display", Proceedings of Electronic Imaging, SPIE-IS &T, vol. 9391, Feb. 9, 2015, pp. 93910E-1 to 93910E-10.

Chai, Jin-Xiang et al., "Plenoptic Sampling", Proceedings of the 27th Annual Conference on Computer Graphics and Interactive Techniques—SIGGRAPH '00, 2000, pp. 307-318.

El-Ghoroury, Hussein S. et al., "Quantum Photonic Imager (QPI): A New Display Technology and Its Applications", Proceedings of the International Display Workshops, vol. 21, Dec. 3, 2014, pp. 1202-1205.

El-Ghoroury, Hussein S. et al., "Quantum Photonic Imager (QPI): A Novel Display Technology that Enables more than 3D Applications", SID Symposium Digest of Technical Papers, vol. 46, No. 1, May 2015, pp. 371-374.

Fehn, Christoph, "Depth-Image-Based Rendering (DIBR), Compression and Transmission for a New Approach on 3D-TV", Proc. of SPIE Stereoscopic Displays and Virtual Reality Systems XI, 2004, pp. 93-104.

Graziosi, Danillo B. et al., "Compression for Full-Parallax Light Field Displays", Stereoscopic Displays and Applications XXV, Proc. of SPIE-IS&T Electronic Imaging, vol. 9011, Mar. 6, 2014, pp. 90111A-1 to 90111A-14.

Graziosi, Danillo B. et al., "Depth assisted compression of full parallax light fields", Stereoscopic Displays and Applications XXVI, Proceedings of SPIE-IS&T Electronic Imaging, vol. 9391, Mar. 17, 2015, pp. 93910Y-1 to 93910Y-15.

International Organisation for, Standardisation, "Use Cases and Requirements on Free-viewpoint Television (FTV)", ISO/IECJTC1/SC29/WG11, MPEG2013/N14104, Geneva, Switzerland, Oct. 2013, 12 pp. total.

(56) References Cited

OTHER PUBLICATIONS

Iwadate, Yuichi et al., "Generating Integral Image from 3D Object by Using Oblique Projection", 18th International Display Workshops 2011 (IDS '11), Dec. 7-9, 2011, pp. 269-272.
Lee, Cheon et al., "View Synthesis using Depth Map for 3D Video", Proceedings of 2009 APSIPA Annual Summit and conference, Sapporo, Japan, 2009, pp. 350-357.
Mori, Yuji et al., "View generation with 3D warping using depth information for FTV", Signal Processing: Image Communication, vol. 24, 2009, pp. 65-72.
Morvan, Yannick et al., "Platelet-based coding of depth maps for the transmission of multiview images", Proceedings of the SPIE, Stereoscopic Displays and Applications, vol. 6055, Feb. 2006, 12 pp. total.
Sjostrom, Marten et al., "Improved Depth-Image-Based Rendering Algorithm", 3DTV Conference: The True Vision—Capture, Transmission and Display of 3D Video (3DTV-CON), 2011, 4 pp. total.
Solh, Mashhour et al., "Depth Adaptive Hierarchical Hole-Filling for DIBR-Based 3D Videos", Proceedings of the SPIE, Three-Dimensional Image Processing (3DIP) and Applications II, vol. 8290, 2012, pp. 829004-1 to 829004-11.
Takahashi, Keita, "Theoretical Analysis of View Interpolation With Inaccurate Depth Information", IEEE Transactions on Image Processing, vol. 21, No. 2, Feb. 2012, pp. 718-732.
Vetro, Anthony et al., "Overview of the Stereo and Multiview Video Coding Extensions of the H.264/MPEG-4 AVC Standard", Proceedings of the IEEE, vol. 99, No. 4, Apr. 2011, pp. 626-642.
Wang, Zhou et al., "Image Quality Assessment: From Error Visibility to Structural Similarity", IEEE Transactions on Image Processing, vol. 13, No. 4, Apr. 2004, pp. 600-612.
Zhao, Yin et al., "Suppressing Texture-Depth Misalignment for Boundary Noise Removal in View Synthesis", 28th Picture Coding Symposium, PSC2010, Nagoya, Japan, Dec. 8-10, 2010, pp. 30-33.
Candes, Emmanuel et al., "Near Optimal Signal Recovery From Random Projections: Universal Encoding Strategies?", 2004, pp. 1-39.
Candes, Emmanuel J. et al., "Robust Uncertainty Principles: Exact Signal Reconstruction From Highly Incomplete Frequency Information," IEEE Transactions on Information Theory, vol. 52, No. 2 (Feb. 2006), pp. 489-509.
Conti, Caroline et al., "Light-Field Video Coding Using Geometry-Based Disparity Compensation", 2014 3DTV-Conference: The True Vision—Capture, Transmission and Display of 3D Video (3DTV-CON), IEEE, Jul. 2, 2014, pp. 1-4.
Donoho, David L., "Compressed Sensing", IEEE Transactions on Information Theory, vol. 52, No. 4, Apr. 2006, pp. 1289-1306.
Dricot, A. et al., "Integral Images Compression Scheme Based on View Extraction", 2015 23rd European Signal Processing Conference (EUSIPCO), Aug. 31, 2015, pp. 101-105.
Fehn, Christoph, "A 3D-TV Approach Using Depth-Image-Based Rendering (DIBR)," Proceedings of Picture Coding Symposium, San Francisco, CA, USA Dec. 2004, 6 pages.
Furihata, H., et al, "Novel view synthesis with residual error feedback for FTV," Stereoscopic Displays and Applications XXI, Proceedings of the SPIE-IS&T Electronic Imaging, vol. 7542, Jan. 2010, pp. 75240K-1 to 75240K-12.
Gilliam, C., et al, "Adaptive Plenoptic Sampling," 2011 18th IEEE International Conference on Image Processing, 2011, pp. 2581-2584.
Gortler, Steven J., et al., "The Lumigraph," Proceedings of the 23rd Annual Conference on Computer Graphics and Interactive Techniques (SIGGRAPH '96), 1996, pp. 43-52.
Heide, F., et al., "Adaptive Image Synthesis for Compressive Displays," Proc. of SIGGRAPH 2013 (ACM Transactions on Graphics), vol. 32, No. 4 (2013), 11 pages.
Hoffman, D.M. et al., "Vergence-accommodation conflicts hinder visual performance and cause visual fatigue," Journal of Vision, vol. 8, No. 3 (2008), pp. 1-30.

International Organization for Standardisation, "Call for Proposals on 3D Video Coding Technology," ISO/IEC JTC1/SC29/WG11, MPEG2011/N12036, Geneva, Switzerland, Mar. 2011, 20 pages.
International Preliminary Report on Patentability for International Patent Application No. PCT/US2019/026619, dated Oct. 13, 2020, 17 pages.
International Preliminary Report on Patentability for International Patent Application No. PCT/US2019/039165, dated Dec. 29, 2020, 6 pages.
International Search Report and Written Opinion for International Patent Application No. PCT/US2019/026619, dated Sep. 17, 2019, 24 pages.
International Search Report and Written Opinion for International Patent Application No. PCT/US2019/039165, dated Sep. 24, 2019, 8 pages.
International Search Report and Written Opinion of International Patent Application No. PCT/US2018/035713, dated Aug. 21, 2018, 17 pages.
International Telecommunication, Union, "H.264, Series H: Audiovisual and MultiMedia Systems, Infrastructure of audiovisual services—Coding of moving video, Advanced video coding for generic audiovisual services," ISO/IEC 14496-10:2003, Coding of Audiovisual Objects—Part 10: Advanced Video Coding, ITU-T Recommendation H.264 (Mar. 2005), 343 pages.
Levoy, Marc, et al., "Light Field Rendering," Computer Graphics, SIGGRAPH 96 Proceedings, 1996, pp. 31-42.
Li, Li, et al., "Pseudo Sequence based 2-D hierarchical reference structure for Light-Field Image Compression," ARXIV.ORG, Cornell University Library, 201 Olin Library Cornell University, Ithaca, NY, Dec. 21, 2016, 10 pages.
Li, Yun et al., "Scalable Coding of Plenoptic Images by Using a Sparse Set and Disparities", IEEE Transactions on Image Processing, vol. 25, No. 1, Jan. 2016, pp. 80-91.
Lim, Chongsoon, et al., "Reference Lists for B Pictures Under Low Delay Constraints", Joint Collaborative Team on Video Coding (JCT-VC) of ITU-T SG16 WP3 and ISO/IEC JTC1/SC29/WG11, 4th Meeting: Daegu, KR, Document: JCTVC-D093, Jan. 20-28, 2011, pp. 1-7.
Liu, Shujie, et al., "New Depth Coding Techniques With Utilization of Corresponding Video", IEEE Transactions on Broadcasting, vol. 57, No. 2, Jun. 2011, oo. 551-561.
Lucente, Mark, "Diffraction-Specific Fringe Computation for Electro-Holography," Doctoral Thesis Dissertation, MIT Dept. of Electrical Engineering and Computer Science (Sep. 1994), 171 pages.
Magnor, M., et al., "Data Compression for Light-Field Rendering," IEEE Transactions on Circuits and Systems for Video Technology, vol. 10, No. 3 (Apr. 2000), pp. 338-343.
Malvar, Henrique S. et al., "Lifting-based reversible color transformations for image compression", Proc. of SPIE of Applications of Digital Image Processing, vol. 7073, 2008, pp. 707301-1 to 707301-10.
Non-Final Office Action for U.S. Appl. No. 15/994,328, dated Jan. 7, 2020, 13 pages.
Non-Final Office Action for U.S. Appl. No. 16/378,228, dated Mar. 5, 2020, 10 pages.
Non-Final Office Action for U.S. Appl. No. 16/452,008, dated Apr. 15, 2020, 23 pages.
Notice of Allowance for Taiwan Patent Application No. 108112656, dateed Dec. 21, 2020, 3 pages.
Notice of Allowance for U.S. Appl. No. 16/378,228, dated Oct. 16, 2020, 6 pages.
Notice of Allowance for U.S. Appl. No. 16/452,008, dated Jan. 27, 2020, 10 pages.
Office Action for Taiwan Patent Application No. 108112656, dated Mar. 13, 2020, 10 pages.
Oh, Kwan-Jung, et al., "Depth Reconstruction Filter and Down/Up Sampling for Depth Coding in 3-D Video", IEEE Signal Processing Letters, vol. 16, No. 9, Sep. 2009, pp. 747-750.
Oh, Kwan-Jung, et al., "Hole-Filling Method Using Depth Based In-Painting for View Synthesis in Free Viewpoint Television (FTV) and 3D Video", Picture Coding Symposium (PCS) 2009, May 6-8, 2009, 4 pages.

(56) References Cited

OTHER PUBLICATIONS

Panasonic Corporation, "Reference Lists for B Pictures Under Low Delay", Document: JCTVC-D093, Joint Collaborative Team on Video Coding (JCT-VC) of ITU-T SG16 WP3 and ISO/IEC JTC1/SC29/WG11 4th Meeting, Jan. 20-28, 2011.

Piao, Yan et al., "Sub-sampling Elemental Images for Integral Imaging Compression", International Conference on Audio Language and Image Processing (ICALIP), 2010, pp. 1164-1168.

Wegner, Krzysztof et al., "Enhanced View Synthesis Reference Software (VSRS) for Free-viewpoint Television", International Organisation for Standardisation, ISO/IEC JTC1/SC29/WG11, MPEG2013/M31520, Geneva, Switzerland, Oct. 2013, 4 pages.

Wetzstein, G., et al., "Compressive Light Field Displays," IEEE Computer Graphics and Applications, vol. 32, Issue 5 (Sep./Oct. 2012), pp. 6-11.

Williams, J. et al., "An Extended Kalman Filtering Approach to High Precision Stereo Image Matching", Proceedings of the 1998 International Conference on Image Processing (ICIP), vol. 2, Oct. 4-7, 1998, pp. 157-16.

Yan, P. et al., "Integral image compression based on optical characteristic", IET Computer Vision, vol. 5, No. 3, 2011, pp. 164-168.

Yang, Lu et al., "Artifact reduction using reliability reasoning for image generation of FTV", Journal of Visual Communication and Image Representation, vol. 21, 2010, pp. 542-560.

Zhang, Cha et al., "A survey on image-based rendering—representation, sampling and compression", Signal Processing: Image Communication, vol. 19, 2004, pp. 1-28.

\* cited by examiner

METHODS FOR FULL PARALLAX LIGHT FIELD COMPRESSION

CROSS REFERENCE TO RELATED APPLICATIONS

This application claims the benefit of U.S. Provisional Application No. 62/514,708 filed on Jun. 2, 2017, the disclosure of which is incorporated by reference herein.

FIELD OF THE INVENTION

Embodiments of the invention relate to image and video compression. More specifically, embodiments of the invention relate to the compression of light field image data as input for light field imaging systems.

BACKGROUND

Depth perception in the human visual system (HVS) relies on several depth cues. These cues can be categorized as either psychological (e.g., perspective, shading, lighting, relative size, occlusion and texture gradient, etc.) or physiological depth cues (e.g., vergence, accommodation, motion parallax, binocular disparity, etc.). While psychological depth cues provide a relative understanding of the depth in a light field, physiological depth cues provide absolute depth information. Commercially available three-dimensional (3D) displays often use a subset of the physiological depth cues to enhance the light field viewing experience.

Glasses-based 3D displays have been gaining popularity since the introduction of glasses-based 3D televisions (TVs) sold by all major TV manufacturers. A shortcoming of the currently available technology is paradoxically the actual use of 3D glasses, which glasses can be categorized as either active or passive. In general, glasses-based technology is known to be uncomfortable for viewers to use for long time periods and poses challenges for people who require prescription glasses.

Existing autostereoscopic displays use directional modulators (such as parallax barriers or lenticular sheets) attached to a display surface to create a 3D effect without requiring glasses. Commercially available autostereoscopic displays typically use horizontal parallax to present 3D information to the viewer. Deficiencies of this form of display technology include a limited viewing angle and a limited resolution per view, each of which results in a lower quality 3D image. In addition, within the viewing angle of such displays, the user is required to keep his or her head vertical. Otherwise, the 3D effect would disappear.

Long viewing times in both glasses-based 3D displays and in horizontal parallax-only light field displays typically cause discomfort due to a physiological effect known as "vergence accommodation conflict" (VAC). VAC is caused by the fact that the viewer's eyes are focused on the display surface plane but also need to converge away from it in order to perceive objects that are depicted at different depths, and thus viewer discomfort occurs.

A more natural 3D effect is achieved using full parallax 3D display technology. In addition to horizontal parallax, full parallax 3D display technology includes vertical parallax such that a vertical movement of the viewer provides a different view of the 3D scene. Full parallax displays generally have an order of magnitude or more views than horizontal parallax-only displays. Arranging these views densely creates a very natural 3D image that does not change when a user moves or tilts his or her head, and also eliminates VAC by providing correct accommodation and vergence cues. 3D displays that eliminate the VAC may be referred to as "VAC-free" 3D displays.

The main challenge associated with the aforementioned full parallax 3D displays is that the increase in modulated image resolution required to render full parallax 3D images with wide viewing angles creates a new impairment for the display system, namely, a dramatically increased amount of image data. The generation, acquisition, transmission and modulation (or display) of very large image data sets required for a VAC-free full parallax light field display requires a data rate in the tens of terabits per second (Tbps).

Currently, the most advanced video compression format, H.264/AVC, can compress ultra-high resolution video frames (e.g., 4,096×2,304 @ 56.3, or 0.5 Gpixels/sec.) at a data bit rate of approximately 3 Gbits/sec. H264/AVC, however, fails to achieve sufficient compression needed for the useable transmission of light field image data, much less if the light field is refreshed in real time at a 60 Hz video rate where data rates can reach up to 86 Tbps.

Moreover, current compression standards do not exploit the high correlation that exists both in horizontal and vertical directions in a full parallax light field image. New compression standards targeting 3D displays are being developed. Nevertheless, they are targeting horizontal parallax only, a limited number of views, and usually require an increased amount of memory and related computational resources. Compression algorithms must balance image quality, compression ratio and computational load. As a general rule, a higher compression ratio in an encoder increases the computational load, making real-time implementation difficult. If both high compression and decreased computational load is required, then image quality is sacrificed. A compression solution that is able to simultaneously provide high image quality, a high compression ratio and relatively low computational load is therefore highly desired.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
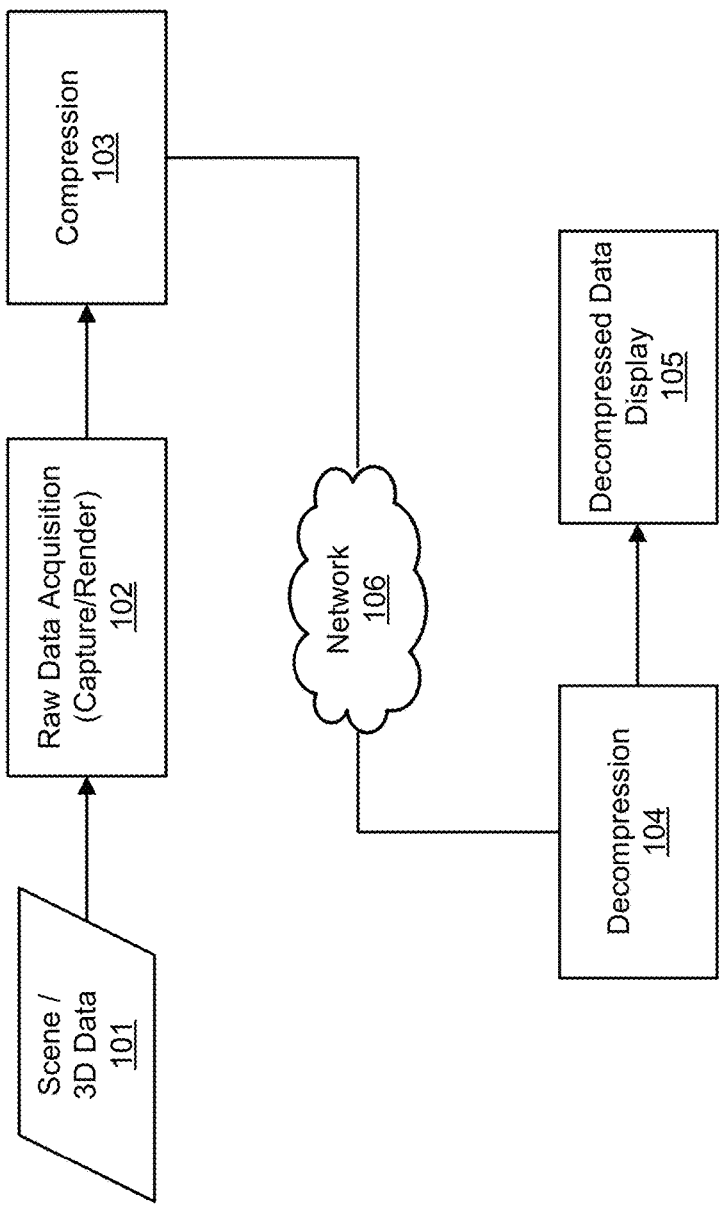
FIG. 1 is a diagram illustrating a conventional light field imaging system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment", "an embodiment" or "some embodiments" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to some embodiments, scene metadata and input images associated with a scene are received. A first encoding operation is performed on the scene metadata and input images to generate reference images and reference disparity information. A second encoding operation is performed on the reference images and reference disparity information to output encoded data. The encoded data includes encoded reference images and encoded reference disparity information. The encoded data is transmitted.

In one embodiment, to perform the first encoding operation on the scene metadata and input images, a subset of the input images is selected as the reference images. One or more disparity maps for each of the selected images are estimated to produce the reference disparity information.

In another embodiment, performing the first encoding operation on the scene metadata and input images further generates reference locations and luminance weights associated with the reference images, where the encoded data further includes the reference locations and luminance weights.

In yet another embodiment, to perform the first encoding operation on the scene metadata and input images, a reference location in each of the selected images is determined to produce the reference locations. A local luminance level for each of the selected images as compared to a global light field luminance level is determined to produce the luminance weights.

In still another embodiment, prior to performing the second encoding operation on the reference images and reference disparity information, a first bit budget of a total bit budget for the reference images and a second bit budget of the total bit budget for the reference disparity information are determined.

According to another aspect, encoded data that includes encoded reference images and encoded reference disparity information are received. A first decoding operation is performed on the encoded data to output decoded reference images and decoded reference disparity information. A second decoding operation is performed on the decoded reference images and the decoded reference disparity information to output one or more decoded images.

In one embodiment, the encoded data further includes reference locations and luminance weights associated with the encoded reference images, and the second decoding operation is further performed on the reference locations and the luminance weights to output the one or more decoded images.

In another embodiment, to perform the second decoding operation on the decoded reference images and the decoded reference disparity information, each reference disparity from the decoded reference disparity information is forward warped to produce a number of forward warped reference disparities. Each of the forward warped reference disparities is filtered to generate a number of filtered reference disparities. The filtered reference disparities are merged into a merged reference disparity. The merged reference disparity and the decoded reference images are backward warped to produce the one or more decoded images.

FIG. 1 is a diagram illustrating a conventional light field imaging system. Referring to FIG. 1, light field imaging system 100, at block 102, performs raw data acquisition by rendering or capturing scene/3D data 101 in a full light field rendering process. Due to the high volume of data, at block 103, light field compression is used to reduce the data size. The compressed data is then transmitted over network 106, for example, to a display system, where the compressed data is decompressed at block 104, and the decompressed data is displayed at block 105. Network 106 may be any type of networks such as a local area network (LAN), a wide area network (WAN) such as the Internet, a cellular network, a satellite network, or a combination thereof, wired or wireless.

Figure 2:
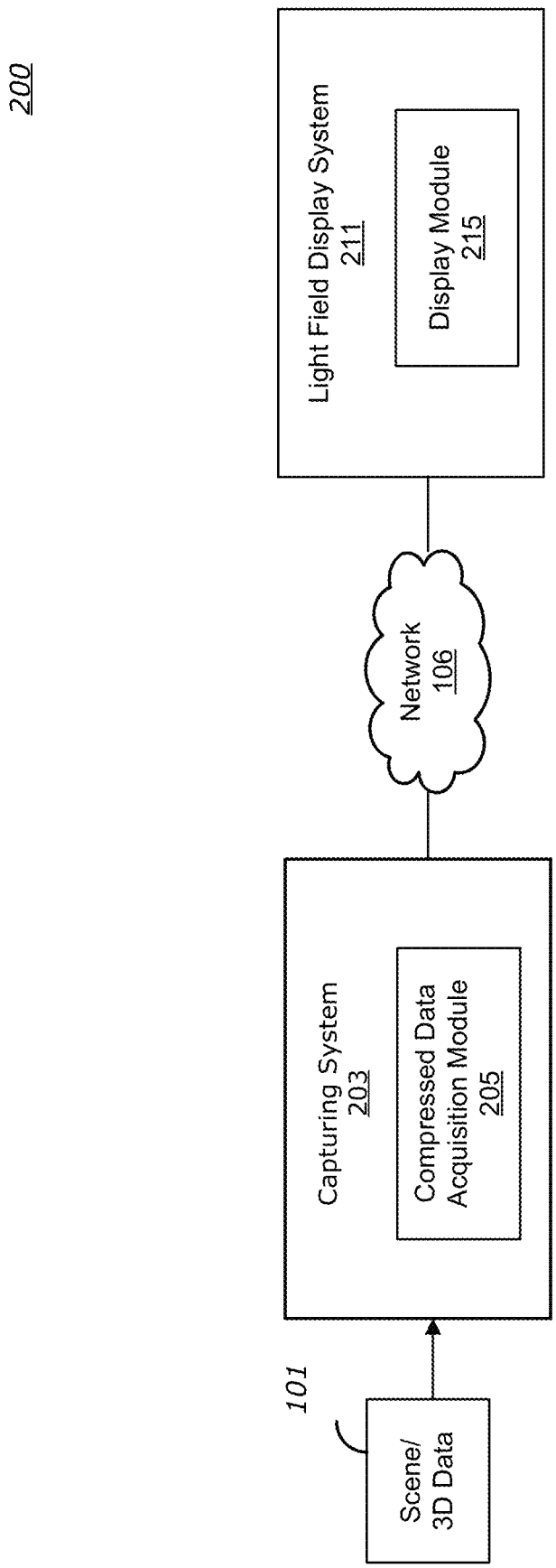
FIG. 2 is a diagram illustrating a light field imaging system according to one embodiment.

FIG. 2 is a diagram illustrating a light field imaging system according to one embodiment. Referring to FIG. 2, light field imaging system 200 may include capturing system 203 and light field display system 211 communicatively coupled to each other over network 106. Capturing system 203 may include a capturing device (not shown) such as a light-field camera, action camera, animation camera, camcorder, camera phone, compact camera, digital camera, high-speed camera, mirrorless camera, or pinhole camera. In one embodiment, capturing system 203 includes, but is not limited to, compressed data acquisition module 205 (also referred to as compressed data acquisition engine, compressed data acquisition logic, or compressed data acquisition unit, which may be implemented in software, hardware, or a combination thereof).

Compressed data acquisition module 205 may capture scene or 3D data 101 in a compressed format that reduces data processing, memory and power consumption at the capturing stage. In one embodiment, scene or 3D data 101 may include aerial terrain texture images, radar or light detection and ranging (LIDAR) data with terrain elevations or city maps, landscapes, computer-generated 3D imagery, medical images, images taken with light field cameras or multiple cameras simultaneously or at different times. In one embodiment, compressed data acquisition module 205 may transmit the compressed data to light field display system 211 over network 106, where the data may be accepted and modulated, for example by display logic 215 (also referred to as display engine, display module, or display unit, which may be implemented in software, hardware, or a combination thereof) included in light field display system 211, in a compressed format that reduces the data processing, memory and power consumption at the light field display system 211, in addition to reducing data transmission requirements.

In one embodiment, compressed data acquisition module 205 may perform compressed rendering and display matched encoding methods, as described in more detail herein below. In one embodiment, compressed data acquisition module 205 may use already available information about scene 101 to reduce the amount of data captured or rendered. The display matched encoding method may compress and format compressed rendering data for display, for example at light field display system 211.

In one embodiment, display logic 215 may perform compressed display using a capture matched decoding method. The capture matched decoding method may include expanding the compressed information in stages. Unlike the traditional methods of expanding or decompressing the entire image data before the image data is displayed, the capture matched decoding method may expand information in stages to allow hierarchical decompression and display of the information.

Compressed Rendering and Display Matched Encoding

Traditional 2D and 3D image capture systems use two stages to capture image data. The first stage is for generating or rendering the image, and the second stage is for compressing data for storage or transmission. To combine both stages into a single step (which may be referred to as "compressed rendering"), priori information about the capturing system 203 and scene 101 may be utilized to determine a subset of light field data that can sufficiently preserve the perceptual quality of the displayed light field image. Determining such subset light field data prior to rendering (or capturing) the light field information reduces the processing and memory requirements for rendering while effectively and simultaneously compressing the light field data. These savings in processing and memory requirements translate into savings in power consumption, and sufficient reduction in system complexity to allow real-time full parallax light field capture. Although the compressed rendering method is designed for capturing a full-parallax light field, in some embodiments, the method can be adopted for other uses, such as horizontal parallax only.

Figure 3:
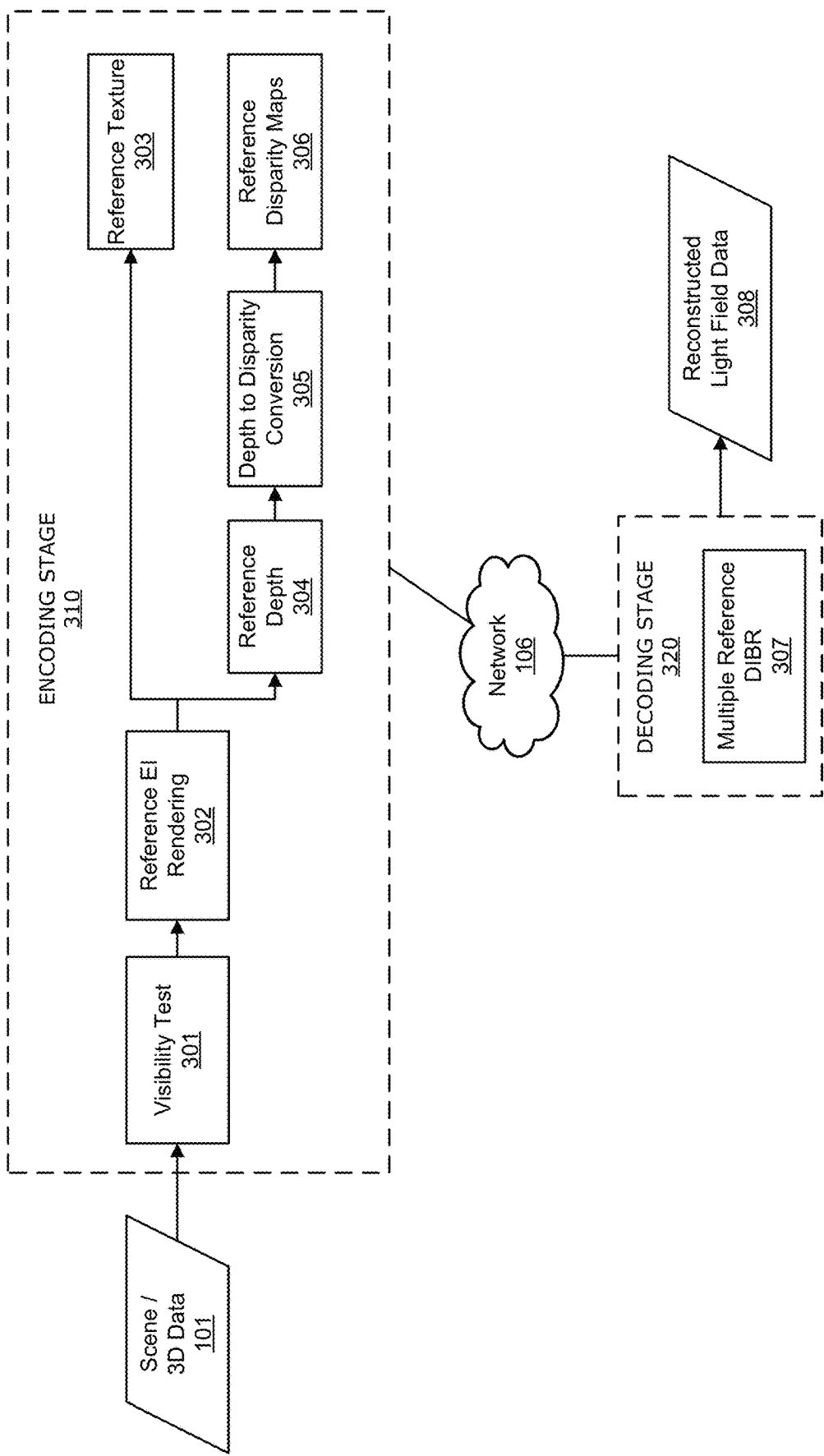
FIG. 3 is a flow diagram illustrating a compressed rendering method according to one embodiment.

FIG. 3 is a flow diagram illustrating a compressed rendering method according to one embodiment. In some embodiments, the compressed rendering method is performed by processing logic which may include software, hardware, or a combination thereof.

Referring to FIG. 3, the compressed rendering method may include encoding stage 310 and decoding stage 320. In one embodiment, encoding stage 310 may be performed by capturing system 203 of FIG. 2, and decoding stage 320 may be performed by light field display system 211 of FIG. 2. In another embodiment, in addition to encoding stage 310, capturing system 203 may perform some portions of decoding stage 320, with light field display system 211 performing the remaining portions of decoding stage 320.

With reference to encoding stage 310, the compressed rendering method may use sub-aperture images, elemental images (EI), or holographic elements (also referred to as "hogels") as coding unit, and assume that information about a scene (e.g., scene 101) and capturing system (e.g., capturing system 203), such as bounding box information, locations of objects, and optical properties of the capturing system are known a priori. Utilizing the information, at block 301, a selection process called visibility test may be invoked to determine a subset of elemental images (or hogels) from scene or 3D data 101 to be rendered. At block 302, the selected elemental images (or hogels) may be rendered to generate reference texture 303 and reference depth 304 (e.g., depth map information) for each elemental image (or hogel). Reference depth 304 may be converted to one or more reference disparity maps 306 (at block 305), and the resulting disparity maps 306 and reference texture 303 may be packetized for transmission over network 106.

Turning now to decoding stage 320, where at block 307, a multiple reference depth image-based rendering (MR-DIBR) algorithm, for example the algorithm or method as disclosed in U.S. Publication No. 2015/0201176, entitled "Methods for Full Parallax Compressed Light Field 3D Imaging Systems," the disclosure of which is incorporated herein by reference, may receive the reference texture 303 and disparity maps 306 over network 106. The MR-DIBR algorithm may use the texture and disparity information to synthesize un-rendered elemental images, for example, from scene 101. In synthesizing the un-rendered elemental images, the MR-DIBR algorithm reconstructs scene 101 and produces reconstructed light field data 308.

Figure 4:
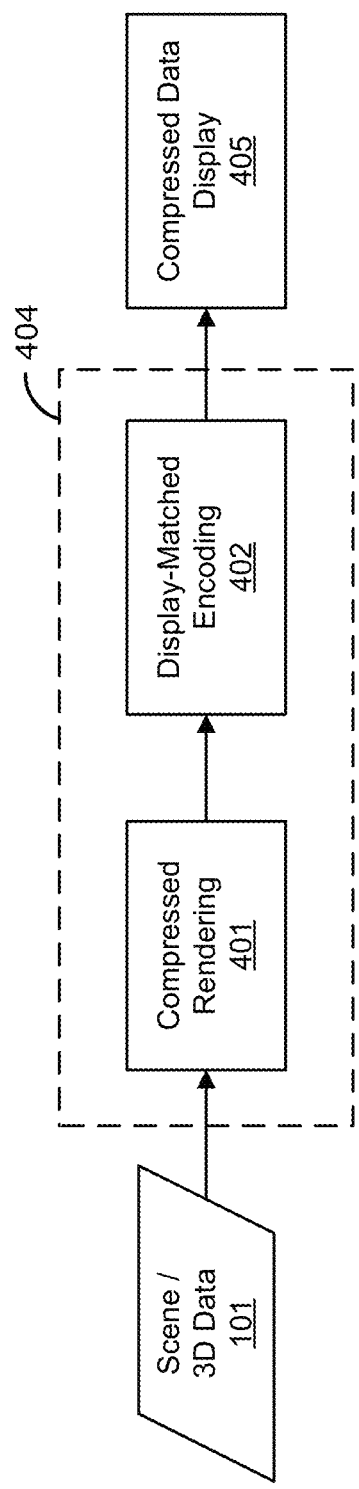
FIG. 4 is a flow diagram illustrating compressed rendering and display matched encoding according to one embodiment.

With continued reference to FIG. 4, which is a flow diagram illustrating compressed rendering and display matched encoding methods according to one embodiment, compressed capturing system 404 may include compressed rendering 401 and display-matched encoding 402. In some embodiments, compressed rendering 401 and display-matched encoding 402 are performed by processing logic which may include software, hardware, or a combination thereof. In one embodiment, compressed rendering 401 may perform the compressed rendering method, as previously described with respect to encoding stage 310 of FIG. 3. That is, compressed rendering 401 may provide reference texture 303 and reference disparity maps 306 to display-matched encoding 402 for further compression. In one embodiment, display-matched encoding 402 may further compress or format reference texture 303 and/or reference disparity maps 306 to fit a receiving compressed data display 405 and data processing requirements. In one embodiment, display 405 may perform a decoding method, as previously described with respect to decoding stage 320 of FIG. 3.

In some embodiments, compressed capturing system 404 (i.e., compressed rendering 401 and display-matched encoding 402) may be adopted in the processing and displaying of immense amount of point cloud data that is typically acquired, for example, by various LIDAR systems. Generally, terabytes of LIDAR data are acquired relatively quickly, however, after acquisition, the processing and the use of the data may take a long time due to difficulties in data transfer. In many cases, placing the data in a storage device (e.g., a hard drive) and transporting the data is the fastest method of transfer. However, compressed rendering 401 and display-matched encoding 402 can reduce the correlation in the data quickly and efficiently leading to a high data compression ratio (e.g., greater than 1000:1).

Figure 5:
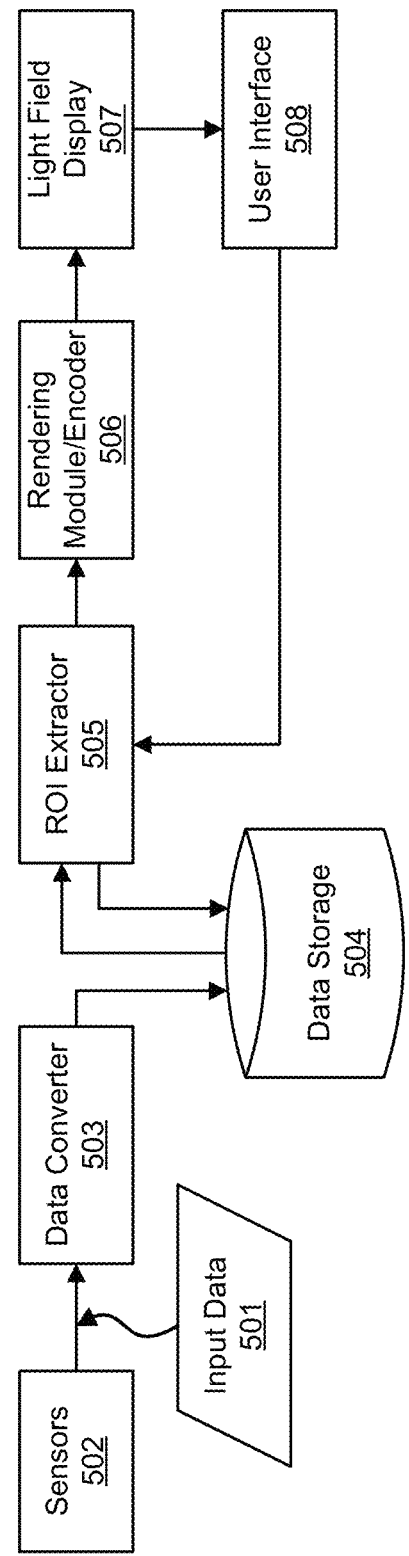
FIG. 5 is a block diagram illustrating an example of a super multi-view full parallax light field display system.

FIG. 5 is a block diagram illustrating an example of a super multi-view (SMV) full parallax light field display (LFD) system. Referring to FIG. 5, sensors 502 (e.g., LIDAR unit, one or more light field cameras) may sense and capture one or more objects within a scene (or an environment) to generate input (or sensor) data 501. Input data 501 for example may include point cloud, mesh, light field camera array, 2D camera array, and/or texture and depth images data of the captured objects within the scene. In one embodiment, input data 501 may be provided to data converter 503 to convert to a preferred data format. The converted data may be stored in data storage 504, such as a mass storage implemented via solid state devices (SSDs) and/or hard disk drives (HDDs), that may store up to petabytes of information in one embodiment. In one embodiment, when a user is working with light field display 507, for example via user interface 508, only a specific region-of-interest (ROI) may be displayed. ROI extractor 505 may request relevant light field data from data storage 504 and send the data to rendering module (or encoder) 506. Rendering module 506 may render or encode the data, and send the rendered/encoded data to display 507 in a compressed format. In one embodiment, the compressed light field data may be fully decoded at display 507. In another embodiment, the compressed light field data may be partially decoded prior to sending to display 507, with final decoding being performed at display 507. In one embodiment, user interactions via user interface (UI) 508 may be handled in real-time, for example, by a feedback loop to ROI extractor 505 either to modify the existing data in storage 504 or to request the next ROI. In some embodiments, data converter 503, extractor 505, encoder 506, and UI 508 may be implemented in software, hardware, or a combination thereof.

In some embodiments, the compressed rendering and display-matched encoding methods, as previously described, may include one or more of the methods (or algorithms) as disclosed in U.S. Publication No. 2015/0201176 to Graziosi et al., Graziosi, D. B., Alpaslan, Z. Y. And El-Ghoroury, H. S., "Compression for full-parallax light field displays", Proceedings of SPIE-IS&T Electronic Imaging, 9011, (2014), Graziosi, D. B.; Alpaslan, Z. Y.; El-Ghoroury, H. S.; "Depth assisted compression of full parallax light fields", Proceedings of Electronic Imaging, IS&T/SPIE Vol. 9391, Feb. 9, 2015, Graziosi, D. B., Alpaslan, Z. Y. and El-Ghoroury, H. S., "Frame Compatible Light Field Compression," SPIE Conference on Three-Dimensional Imaging, Visualization, and Display, 2016, U.S. Publication No. 2016/0360177, entitled "Methods for Full Parallax Compressed Light Field Synthesis Utilizing Depth Information," and U.S. Publication No. 2016/0021355, entitled "Preprocessor for Full Parallax Light Field Compression," the disclosures of which are incorporated herein by reference.

In some embodiments, the compressed rendering and display-matched encoding methods reduce the computational burden and data rate of the system simultaneously. This, for example, is done by first performing a visibility test which determines the elemental images that can fully reconstruct the scene without reducing the effective angular pitch, and then encoding these elemental images in a way that matches the target LFD and human visual system's capabilities. See, e.g., Alpaslan, Z. Y.; El-Ghoroury, H. S.; Cai, J.; "Parametric Characterization of Perceived Light Field Display Resolution," SID Symposium Digest of Technical Papers 47(1):1241-1245, May 2016, the disclosure of which is incorporated herein by reference.

Figure 6:
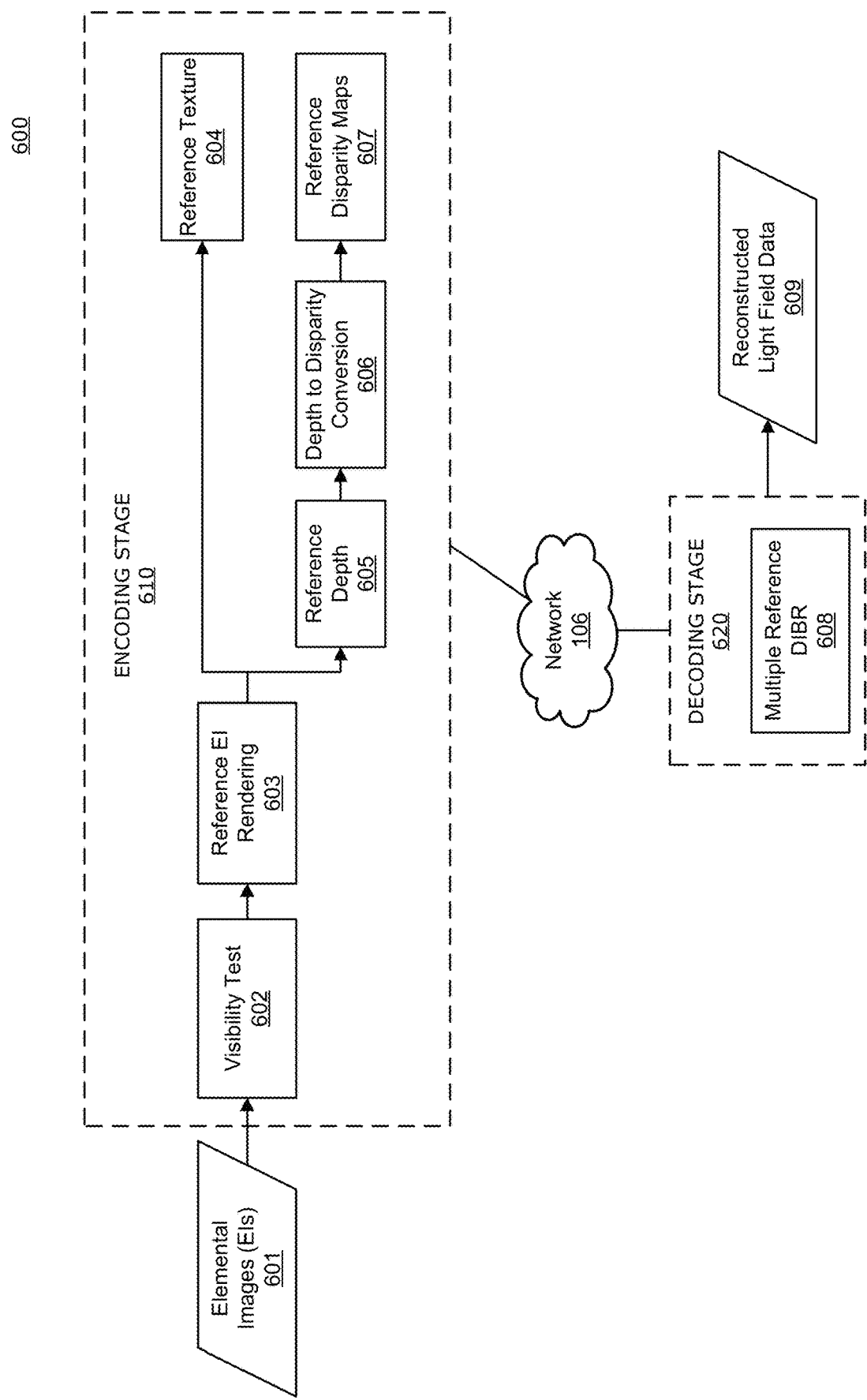
FIG. 6 is a flow diagram illustrating another compressed rendering method according to one embodiment.

FIG. 6 is a flow diagram illustrating another compressed rendering method according to one embodiment. In one embodiment, compressed rendering method 600 is performed by processing logic which may include software, hardware, or a combination thereof. In one embodiment, the compressed rendering method 600 introduces two methods in the field of full parallax light field rendering and compression, namely:

(1) Visibility Test that determines the minimum subset of necessary elemental images to render before compression, thereby eliminating unnecessary rendering operations, and (2) Multi-reference depth image based rendering (MR-DIBR): Using references that include horizontal and vertical parallax information in DIBR.

In various embodiments, the compressed rendering method 600 may provide the following advantages:

(1) The sampling pattern is determined for each frame and only sampled elemental images are rendered, thereby reducing rendering operations and memory requirements significantly, (2) The sampling pattern is determined by examining the bounding box of the objects in the scene, thereby achieving adaptive sampling accuracy without complex operations, and (3) In addition to texture data, disparity information for each sampled elemental image is also transmitted. Although some overhead are added in this situation, perceived image quality also increases.

Generally, traditional 2D and 3D image capturing systems use two stages to capture image data. The first stage is for generating or rendering the image, and the second stage is for compressing the data for storage or transmission. Previously, examined light field compression algorithms also followed the traditional paradigm of capture first and compress later. Here, the method 600 unites both stages in one step (which may be referred to as "compressed rendering"). Compressed rendering utilizes the a priori knowledge about the capturing system and the scene to determine a subset of light field data that can sufficiently preserve the perceptual quality of the displayed light field image. Determining this subset of light field data prior to rendering (or capturing) the light field information reduces the processing and memory requirements for rendering while effectively compressing the light field data simultaneously. These reductions in processing and memory requirements may translate into reductions in power consumption, and sufficient reduction in system complexity to allow real-time full parallax light field capture. Compressed rendering algorithm is designed for capturing a full-parallax light field, and unlike many conventional rendering algorithms, and it is not restricted to a horizontal-parallax only setup.

With continued reference to FIG. 6, the compressed rendering method (or algorithm) includes encoding stage 610 and decoding stage 620. In one embodiment, the compressed rendering method 600 may be similar to that in FIG. 3. Therefore, in one embodiment encoding stage 610 may be performed by capturing system 203 of FIG. 2, and decoding stage 620 may be performed by light field display system 211 of FIG. 2. In another embodiment, in addition to encoding stage 610, capturing system 203 may perform some portions of decoding stage 620, with light field display system 211 performing the remaining portions of decoding stage 620.

Still referring to FIG. 6, the compressed rendering algorithm uses elemental images (EIs) 601 as the coding unit, and assumes that basic information about the scene and capture system such as bounding box, locations of the objects, and optical properties of the capture system are known a priori. Utilizing this information, referring to encoding stage 610, a selection process called visibility test may be invoked (at block 602) to determine a subset of elemental images from elemental images 601 to be rendered. That is, the subset of elemental images is used as references for synthesizing the entire light field. In one embodiment, the visibility test selects the subset of elemental images in order to reduce not only the overall rendering computation but also the bandwidth. This approach is somewhat similar to plenoptic sampling. See, e.g., Chai, J.-X., Chan, S.-C., Shum, H.-Y. and Tong, X., "Plenoptic sampling," Proceedings of the 27th annual conference on Computer Graphics and Interactive Techniques—SIGGRAPH'00, 307-318 (2000). In plenoptic sampling, the optimal camera distance is determined according to the object's depth in the scene. However, plenoptic sampling does not consider per-pixel depth and usually performs only image-based rendering (IBR) which causes blurriness in the final image.

Figure 7:
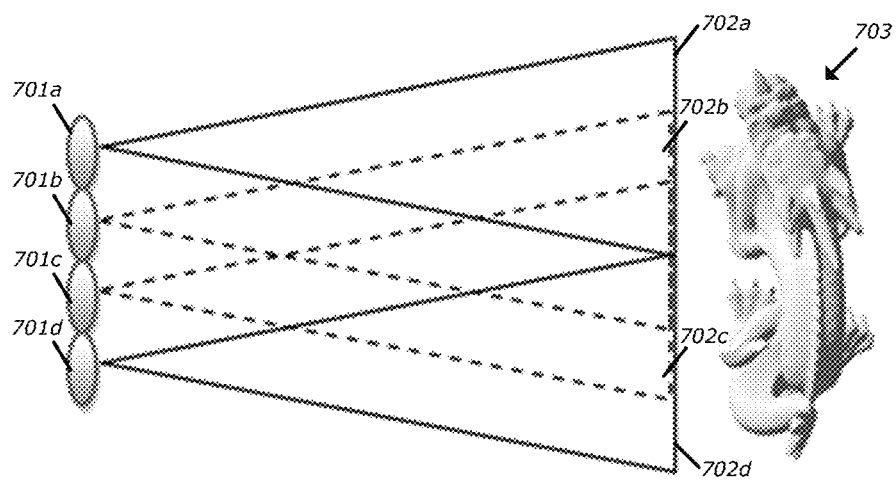
FIG. 7 is a diagram illustrating an example of an object being captured by a number of lenses.

In one embodiment, the visibility test incorporates a trade-off between real-time implementation requirements (e.g., highly parallelizable solution, minimum dependency between elements) and content redundancy (e.g., correlation between elements, high compression and power savings). With respect to content redundancy, referring now to FIG. 7, object 703 is captured by a number of lenses 701a-d that produces respective frusta 702a-d. As can be seen in FIG. 7, the overlapping frusta (e.g., frusta 702a and 702d) of only some lenses (e.g., lenses 701a and 701d) can cover the entire object 703, thereby making other lenses (e.g., lenses 701b-c) redundant. In one embodiment, the derivation of the distance between the elemental images is obtained by using the field of view of the lens and distance of the object to the screen. In some embodiments, the boundaries of the object are also considered in selecting the optimal reference arrangement of the elemental images.

Generally, a primary cause of quality degradation in synthesized images is the presence of holes. Holes can develop when background texture is disoccluded due to the presence of objects at different depths.

To avoid or eliminate the presence of holes, in one embodiment possible hole-causing regions are identified and extra reference elemental images are added to the reference list. The extra image provides the texture for the disoccluded background. This has a higher quality than synthesized texture and less computational impact. Therefore, the selection of elemental images aims to cover the entire object and avoid (or eliminate) holes during the synthesis process. By selecting multiple references, the probability of hole occurrence is minimized.

With continued reference to FIG. 6, at block 603, the selected subset of elemental images is rendered to generate the appropriate reference texture 604 and reference depth 605 (e.g., depth map information) for each elemental image in the subset. At block 606, reference depth 605 is converted to one or more reference disparity maps 607, and the resulting disparity map(s) 607 and reference texture 604 are packetized for transmission over network 106 (as previously described).

With respect to depth to disparity conversion (block 606), due to the uniform geometric arrangement of elemental lenses used to generate a light field, the depth value of a reference elemental image can be converted into horizontal and/or vertical shifts according to the distance between a target image and a reference image. These disparity values are used to rearrange the reference texture at the desired elemental image position. In one embodiment, the depth of reference images is converted into disparities, where the relative distance between the target image and the reference provides the direction of shifting. The use of disparity instead of depth is more efficient in the coding point of view, and also a division operation is avoided, thereby simplifying the decoder implementation. In one embodiment, the formula in Eq. (1) below can be used for depth to disparity conversion:

$$\text{disparity} = \frac{f \times P}{z \times \text{pixel pitch}}, \quad \text{Eq. (1)}$$

where f is the focal distance of micro-lens, z is the depth of an object, and P is the elemental lenses pitch. Due to the similarity between the lenses, the disparity between the reference elemental image and any other image can be determined by scaling the converted value using the relative distance between the images. It should be noted that this distance also provides the direction of pixel shifting according to the position of the elemental images.

In one embodiment, the depth to disparity conversion may use fixed-point arithmetic instead of floating-point arithmetic since fixed-point has a more efficient hardware implementation. In current DIBR algorithms, the depth values are usually mapped to eight (8) bits, which provides enough accuracy for the synthesis operation. However, since fixed-point arithmetic limits the precision of a system, in one embodiment, ten (10) bits are used to represent the converted disparity values. Simulations have shown that the number of bits used provides sufficient accuracy for the dimension of the system, but further optimization may be performed in case the display dimension and depth range changes.

Referring now to decoding stage 620, at block 608, reference texture 604 and reference disparity maps 607 are received from network 106. Then, an MR-DIBR algorithm may be invoked to synthesize un-rendered elemental images from EIs 601 using the received reference texture 604 and disparity maps 607. That is, for the remaining (or missing) elemental images, the conventional intensive computer graphics rendering routine is substituted by the MR-DIBR algorithm. The term "multiple reference" (or MR) refers to a synthesis approach that uses more references than generally used in existing DIBR implementations. For example, existing DIBR algorithms generally use two references while the MR-DIBR algorithm uses four or more references. The reason is twofold: (1) existing DIBR implementations are customized for horizontal parallax only sequences while the MR-DIBR algorithm targets full-parallax, and (2) using multiple references at the same time reduces the probability of holes in the final synthesized image.

Figure 8:
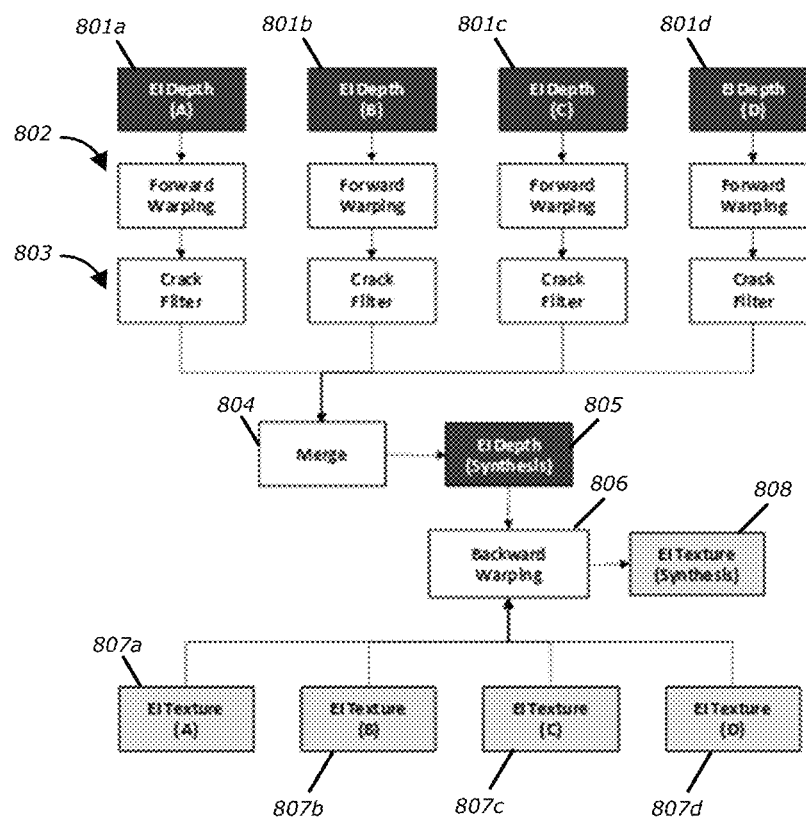
FIG. 8 is a flow diagram illustrating a multiple-reference depth-image based rendering (MR-DIBR) algorithm according to one embodiment.

Referring now to FIG. 8, which is a flow diagram illustrating the MR-DIBR algorithm according to one embodiment, the following steps may be performed in order to synthesize the elemental images disparity (e.g., disparity maps 607) and texture (e.g., reference texture 604):

(1) Perform forward warping 802 for each of reference disparities or disparity maps 801*a-d* (i.e., EI reference depth), (2) Apply a crack filter 803 in each of the forward warped reference disparity, (3) Merge (at block 804) the warped and filtered reference disparities into reference disparity 805 (i.e., synthesized EI depth), and (4) Perform backward warping 806 using the merged reference disparity 805 and reference textures 807*a-d* to produce synthesized EI texture 808.

In some embodiments, the MR-DIBR algorithm is performed by processing logic which may include software, hardware, or a combination thereof. It should be appreciated that while FIG. 8 illustrates four reference disparities and four reference textures, in some embodiments, more than four reference disparities and reference textures may be utilized.

In one embodiment, the use of multiple references increases the chance that the disoccluded texture after warping will be present in one of the reference disparities, and therefore hole filling is minimized or completely avoided. This provides a better quality than synthetic hole-filling algorithms; however it requires a careful selection of the reference elemental images while increasing MR-DIBR processing time and memory usage.

In forward warping 802, the reference disparities are shifted according to the distance between the target elemental image and the reference elemental image, and their respective disparity values. In order to reduce the memory usage of multiple references, only the disparity is used for forward warping. Due to round-off and quantization errors, cracks may appear in the forward warped disparity. Hence, crack filter 803 is used to detect the erroneous disparity values and correct them with neighboring disparities. The warped and filtered disparities are then merged together (at block 804), and since multiple references are used, there is a probability that the disoccluded view will be present in one of the references. Finally, in backward warping stage 806 the merged disparity 805 is used to indicate the location in the reference images to obtain the final texture.

Referring back to FIG. 6, in synthesizing the un-rendered elemental images, the MR-DIBR algorithm reconstructs the scene in EIs 601 and produces reconstructed light field data 609. Since the MR-DIBR algorithm uses images to render new scenes, its final quality is similar to other memory-intensive image-based rendering methods. However, with the use of per-pixel geometry information, the number of views used for rendering may be reduced while simultaneously maintaining the rendering quality. The use of depth decouples the generation stage from the display stage of 3D multi-view systems.

Previously, the Moving Picture Experts Group (MPEG) 3D video standard of free viewpoint television (FTV) has looked for proposals that use depth in horizontal parallax only coding algorithms. See, e.g., ISO/IEC JTC1/SC29/WG11 MPEG2013/N14104, "Use Cases and Requirements on Free-Viewpoint Television (FTV)," Geneva, Switzerland, October (2013). Here, the compressed rendering method 600 takes a step further by considering full parallax light fields. By using depth maps, for example, the method can save power at encoding stage 610 by generating only a few reference EIs and their respective reference depth 605 (e.g., depth maps), and synthesize the remaining light field through MR-DIBR.

In some embodiments, as with the compressed rendering 401 and display-matched encoding 402 methods previously described with respect to FIGS. 3-4, reference texture 604 and reference disparity maps 607 may be provided to a display-matched encoding method for further compression prior to the transmission over network 106. In one embodiment, the display-matched encoding method may further compress or format reference texture 604 and/or reference disparity maps 607 to fit a receiving compressed data display and data processing requirements.

As previously described, the compressed rendering method 600 uses elemental images with associated disparity maps 607 to represent the light field in a compressed manner. At first, a high level analysis of the 3D scene may extract the position of the elemental images that should be rendered (also referred to as references). The reference elemental images are rendered (at block 603) with their associated reference depth (or depth maps) 605, which are converted to disparity maps 607. At the display, the reconstruction algorithm utilizes MR-DIBR to reconstruct the missing elemental images. In contrast to the view synthesis technique being studied by the MPEG group, which is suitable for horizontally aligned views and handles only two references, the MR-DIBR technique can use multiple references at any position in a 2D camera grid used to capture the scene, and is able to handle horizontal and vertical pixel shifts.

In one embodiment, display-matched encoding adds compression to the reference texture (or elemental images) 604 and the reference disparity maps 607, thereby exploiting any remaining correlation among the reference elemental images and disparity maps. In contrast to multi-view coding schemes that encode reference views and use view synthesis prediction to encode residual views, the reconstruction of the non-reference views, in one embodiment, is performed by using the MR-DIBR technique. This way, views can be reconstructed immediately after receiving the reference views, and no additional information needs to be sent to the decoder.

In some embodiments, similar to MPEG, the compressed rendering method 600 utilizes a per-pixel depth-based 3D data format, where the elemental image's texture and its per-pixel depth converted into disparity are used. In case of computer generated content, the capturing camera can be placed at the elemental image's position and the texture and disparity can be obtained directly from double frustum cameras. The disparity is calculated from the depth buffer used for rendering purposes. In the case of 2D camera arrays, depth maps can be obtained for example with depth estimation algorithms, which can then be converted to disparity and used in the same way by our proposal.

In some embodiments, reference elemental images may be selected in an adaptive way, for example, from a high-level analysis of the scene content. In one embodiment, the compressed rendering method 600 may adapt to the scene content and obtain higher compression efficiency and better view reconstruction than fixed reference schemes. Here, the method also obtains a high-level scene description from multi-view texture and depth maps only.

In some embodiments, the texture of reference elemental images is compressed using a transform-quantize paradigm, and the disparity maps are encoded with a run-length encoder. This feature, for example, can achieve higher compression and utilize the compressed rendering method 600 even for scenes that require the rendering of several reference elemental images, or the adoption of high resolution reference elemental images.

In some embodiments, the conditions necessary for elemental image sub-sampling of full parallax light fields are determined and the optimal rate-distortion performance of elemental image compression is provided according to the scene content.

In some embodiments, the compressed rendering method 600 is suitable for a full parallax light field display system with high resolution elemental images. Since requirements of the full parallax light field display system may affect not only the data transmission but also the data generation, the texture plus depth format may be adopted to decouple the data display from the data generation. With this data format, a reduced set of elemental images may be captured or rendered, and the missing elemental images may be reconstructed directly at the display system (e.g., light field display system 211 of FIG. 2).

Figure 9:
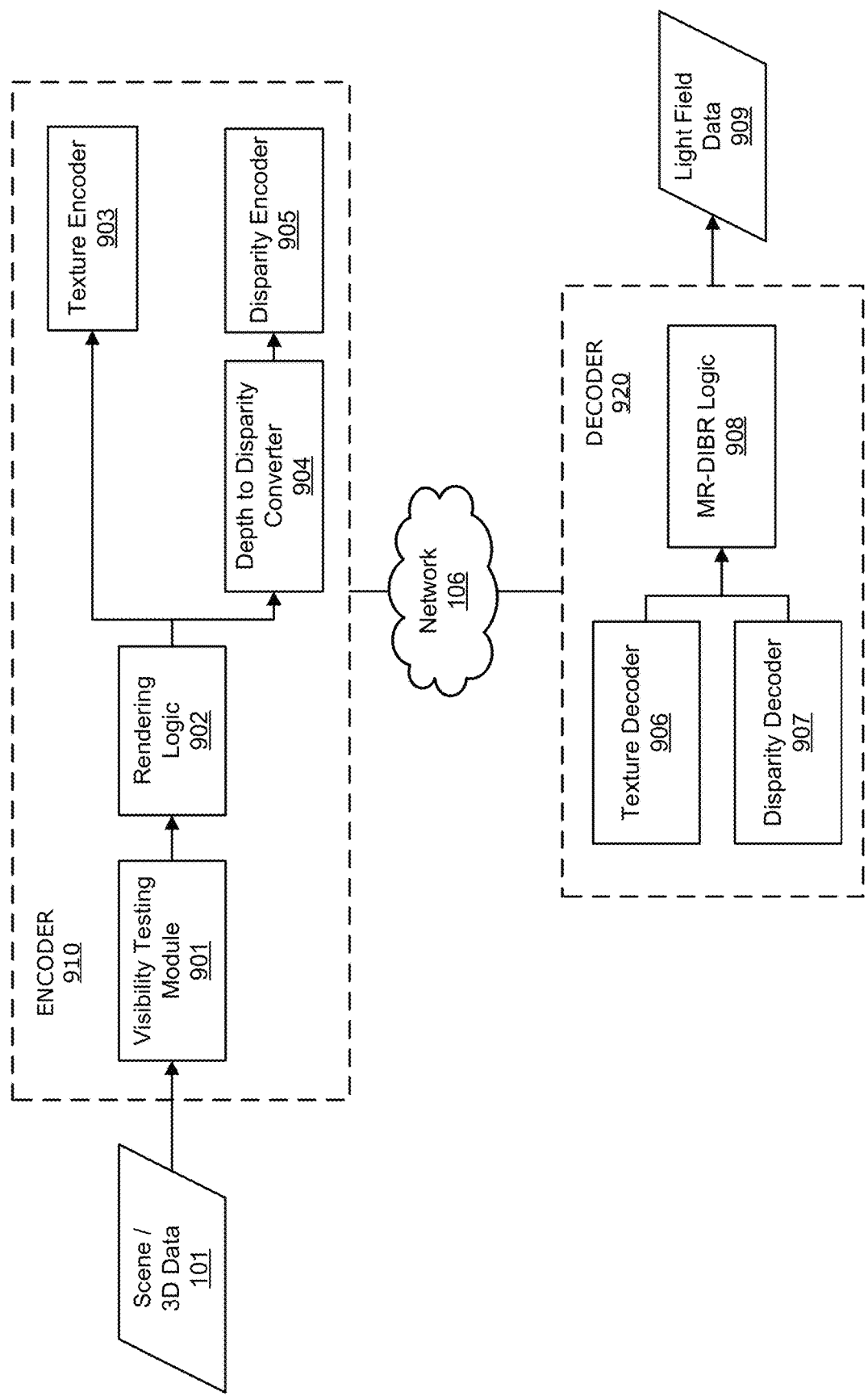
FIG. 9 is a block diagram illustrating an example of a light field compression system according to one embodiment.

FIG. 9 is a block diagram illustrating an example of a light field compression system according to one embodiment. Referring to FIG. 9, the light field compression system may include encoder 910 and decoder 920. In some embodiments, encoder 910 and decoder 920 and associated modules or logic (e.g., modules 901-908) included therein may be implemented in software, hardware, or a combination thereof. In one embodiment, encoder 910 may be implemented as part of capturing system 203 of FIG. 2, and decoder 920 may be implemented as part of light field display system 211 of FIG. 2. In another embodiment, in addition to encoder 910, capturing system 203 may include some portions of decoder 920, with light field display system 211 including the remaining portions of decoder 920.

As shown in FIG. 9, encoder 910 includes a visibility testing module 901, rendering logic 902, and depth to disparity converter 904. In one embodiment, visibility testing module 901, rendering logic 902, and depth to disparity converter 904 may respectively perform the visibility test 602, reference EI rendering 603, and depth to disparity conversion 606 (as previously described with respect to FIG. 6), and for brevity sake, are not described again. However, in encoder 910, to perform compression of reference elemental images, texture encoder 903 and disparity encoder 905 are added. In one embodiment, texture encoder 903 and disparity encoder 905 may perform the same or similar operations. However, their contribution to bitrate may be different. For example, in one embodiment, approximately 80-85% of bit budget may be used for texture encoder 903, and approximately 15-20% of the bit budget is used for disparity encoder 905.

In one embodiment, encoders 903 and 905 may invoke (or apply) methods similar to intra encoding in H.264/MPEG-4 Advanced Video Coding (AVC) or H.265 High Efficiency Video Coding (HEVC) algorithm. For example, in one embodiment, encoders 903 and 905 may respectively transform red, green, and blue (RGB) values of reference texture and reference disparities (or disparity maps) to YCoCg color space. YCoCg color space refers to a color space that is formed from a transformation of an associated RGB color space into a luma value (which may be denoted as Y), two chroma values called chrominance green (Cg), and chrominance orange (Co). Each color channel may be divided into blocks of size, for example 4×4, and an integer transformation may be applied. Transform coefficients of the transformation may be quantized and the coefficients may be encoded using a signal encoder, such as differential pulse-code modulation (DPCM) scheme for the DC value, and a run-length encoder for the AC values. Subsequently, in one embodiment, an entropy encoder (e.g., Huffman coding) may be utilized to further compress the coded coefficients. In one embodiment, the final quality of the texture, as well as the amount of bits used to code the texture, is controlled by the quantization parameter. In some embodiments, encoded texture and encoded disparity (respectively generated by texture encoder 903 and disparity encoder 905) may be packetized and transmitted to decoder 920 over network 106 for decoding.

In some embodiments, the encoding (or compression) method explained above may generate only a subset of views. The remaining views may be synthesized directly at the display system. The synthesis of other views can be made immediately after receiving the references and all in parallel, since they do not depend on each other. In one embodiment, it is assumed that the rendering process is optimal and that a viewer does not perceive any artifacts. In one embodiment, to improve the quality of view-dependent features, residual information may be sent. That is, the difference (or delta) between the original view and the synthesized view using the recently received references may be transmitted to decoder 920 over network 106 for decoding. This requires the rendering or acquisition of the full light field data. A better compromise between compression and quality are algorithms that identify critical areas of the light field and perform rendering only for those specific parts.

Turning now to decoder 920, as shown decoder 920 includes texture decoder 906, disparity decoder 907, and MR-DIBR logic 908. MR-DIBR logic 908 may perform the MR-DIBR algorithm 608, as previously described in FIG. 6, and for brevity sake, is not described again.

Texture decoder 906 and disparity decoder 907 may respectively receive the encoded texture and encoded disparity from network 106 for decoding. In one embodiment, the decoding procedure is parallelizable to the encoding procedure. The encoded reference texture and reference disparity can be decoded simultaneously since they are not dependent on each other. Similarly, the syntheses for the remaining views do not depend on other non-reference views and can be performed in parallel. However, decoder 920 needs to identify the received packets and associate the decoded information to the correct elemental image position. Therefore, in one embodiment, header information is annexed to the bit stream of each elemental image prior to transmission to decoder 920, so that decoder 920 can place the decoded information in the reconstructed light field image. The header in one embodiment may include a unique identification of the elemental image, a coordinate of the elemental image in the light field, and the quantization parameter used to compress the texture information.

In some embodiments, due to the strict timing requirements for real-time decoding and display of a light field display system, the latency of the bit stream can be difficult to manage. With higher compression, decoder 920 needs to perform more operations to reconstruct the light field, which may not be ready in time for display. Another factor that influences decoder 920's performance is the memory availability. Constraints of memory at decoder 920 may impose restrictions on the light field compression system as well. Therefore, the display hardware of the light field display system may influence the light field compression system, which may force the entire system to be re-designed. In summary, the design space of a compression algorithm for full parallax light field display system may need to take into account various factors, such as decoding time, available memory, pixel dimension, power consumption, etc.

Figure 10:
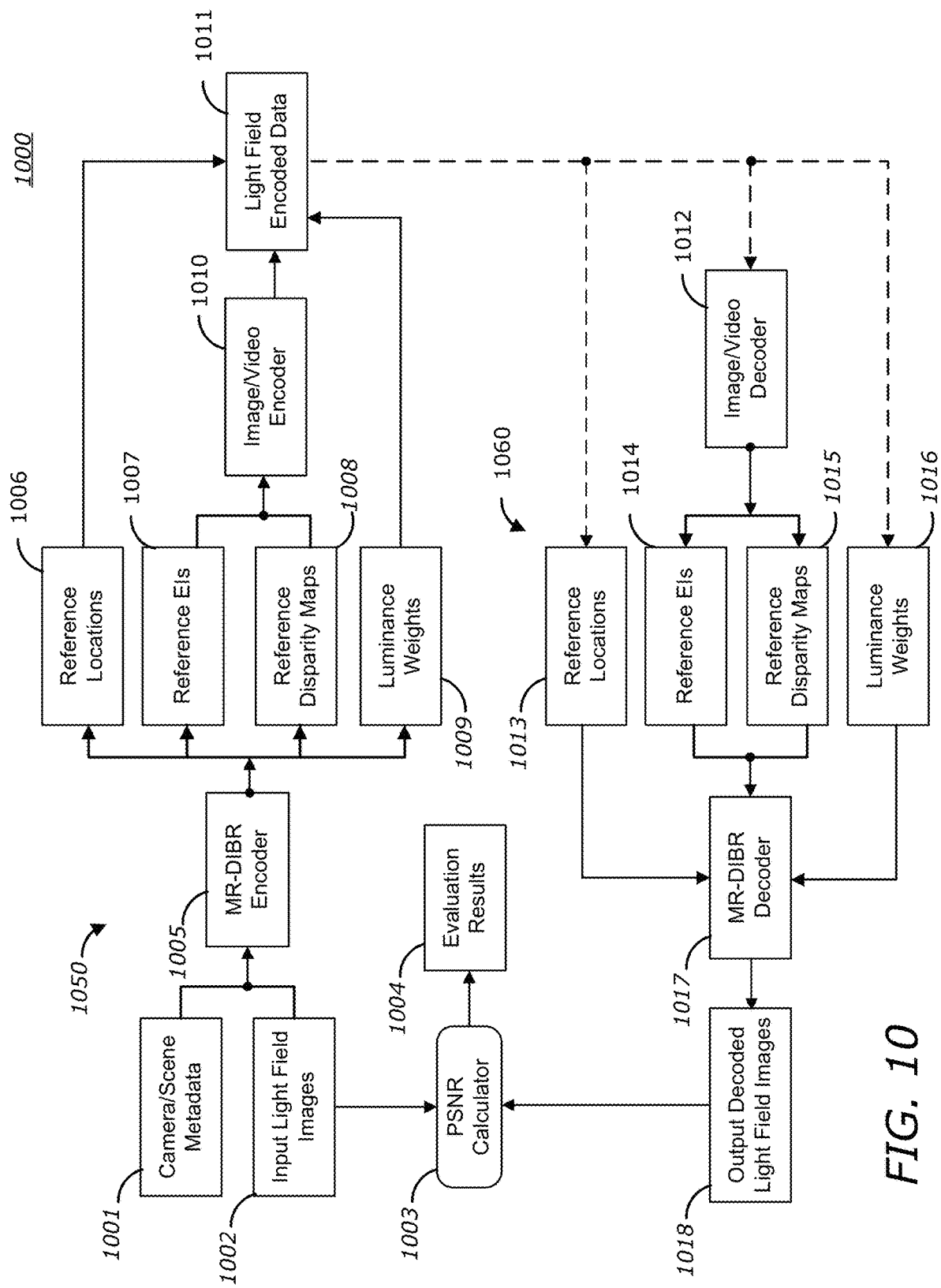
FIG. 10 is a block diagram illustrating an example of another light field compression system according to one embodiment.

FIG. 10 is a block diagram illustrating an example of another light field compression system according to one embodiment. Referring to FIG. 10, the light field compression system (or codec) 1000 may include an encoding stage 1050 and a decoding stage 1060. In some embodiments, encoding stage 1050 and decoding stage 1060 and associated modules (e.g., modules 1003, 1005, 1010, 1012, 1017) included therein may be implemented in software, hardware, or a combination thereof. In one embodiment, encoding stage 1050 may be implemented as part of capturing system 203 of FIG. 2, and decoding stage 1060 may be implemented as part of light field display system 211 of FIG. 2. In another embodiment, in addition to encoding stage 1050, capturing system 203 may include some portions of decoding stage 1060, with light field display system 211 including the remaining portions of decoding stage 1060.

With continued reference to FIG. 10, in one embodiment, encoding stage 1050 may include MR-DIBR encoder 1005, video encoder 1010, and peak signal-to-noise ratio (which may be referred to as "PSNR") calculator 1003. In another embodiment, PSNR calculator 1003 may instead be included in decoding stage 1060, as described in more detail herein below. As shown, camera (or scene) metadata 1001 and input light field images 1002 are provided to MR-DIBR encoder 1005. In one embodiment, metadata 1001 may include optical characteristics of a capturing device and the captured data, such as camera pixel count, camera location (s), lens FOV, scene composition, its distance from the camera(s), and/or display device characteristics.

Figure 11:
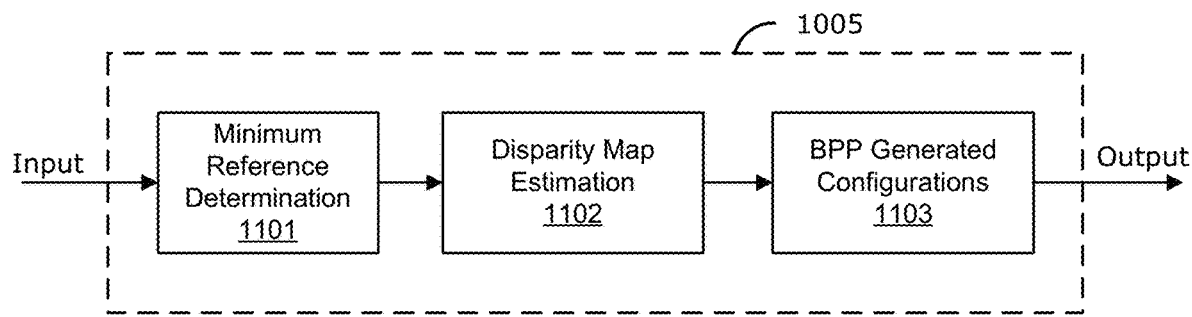
FIG. 11 is a block diagram illustrating an example of an MR-DIBR encoder according to one embodiment.

Referring now to FIG. 11, which is a block diagram illustrating an example of MR-DIBR encoder 1005 according to one embodiment, MR-DIBR encoder 1005 receives and utilizes metadata 1001 and input light field images (e.g., elemental images, hogels) to determine and generate a minimum number of reference EIs 1007 (at block 1101) required to reconstruct the full light field (e.g., the visibility test as previously described) along with reference locations 1006 in reference EIs 1007 to obtain final light field images. MR-DIBR encoder 1005 then calculates or estimates one or more reference disparity maps for each of the generated reference EIs 1007 (at block 1102), thereby producing a number of disparity maps 1008. Once the reference EIs 1007 and disparity maps 1008 are determined, a target bit rate, or bits per pixel (bpp) value, is generated to configure the display-matched encoding stage. That is, bpp generated configurations are used to configure the display-matched encoding stage (at block 1103). In one embodiment, the bpp generated configurations may include reference selection adjustment, texture versus disparity map weights, and/or on/off luminance scaling. In one embodiment, if a higher quality reconstruction is necessary, additional reference elemental images and reference depth maps may be added to the encoding stage.

Referring back to FIG. 10, in one embodiment, the display-matched encoding stage uses image (or video) encoder 1010 (e.g., JPEG, JPEG 2000, or JPEG XS encoder, or MPEG, H.264, HEVC, Theora, RealVideo, RV40, VP9, AV1, AVI, FLV, RealMedia, Ogg, QuickTime, or Matroska encoder) to further compress the reference EIs 1007 (or reference textures) and reference disparity maps 1008. In one embodiment, prior to initiating encoder 1010, the bit budget for the reference EIs 1007 (e.g., between 80-85% of total bit budget) and reference disparity maps 1008 (e.g., between 15-20% of the total bit budget) are determined, and the bit budgets may be used as inputs for encoder 1010.

In one embodiment, encoder 1010 may compress (or encode) reference EIs 1007 and reference disparity maps 1008 (in accordance with the bit budget, in one embodiment) in order to generate compressed information (e.g., compressed reference EIs, disparity maps). The compressed information and reference locations 1006 may be included in light field encoded data 1011 (e.g., an encoded light field file) for transmission.

In one embodiment, luminance variations in a light field image are supported in encoding stage 1050. For example, prior to encoding reference EIs 1007, MR-DIBR encoder 1005 may determine a local luminance level (which may include a luminance weight or luminance scaling parameter of each color component) of each of the reference EIs 1007, as compared to a global light field luminance level, to produce a number of luminance weights 1009 corresponding reference EIs 1007. The local luminance level of each reference EI may be preserved by passing luminance weights 1009 to light field encoded data 1011 for transmission, for example over a network, such as network 106. Accordingly, light field encoded data 1011 includes reference locations 1006, luminance weights 1009, encoded reference EIs and encoded reference disparity maps.

Still referring to FIG. 10, decoding stage 1060 includes image (or video) decoder 1012 and MR-DIBR decoder 1017. In one embodiment, decoding stage 1060 may further include PSNR calculator 1003 (as previously described). As shown, light field encoded data 1011 is transmitted to decoder 1012 (e.g., JPEG, JPEG 2000, or JPEG XS decoder, or MPEG, H.264, HEVC, Theora, RealVideo, RV40, VP9, AV1, AVI, FLV, RealMedia, Ogg, QuickTime, or Matroska decoder) to decode (or decompress) the compressed (or encoded) reference EIs and reference disparity maps. The decoded reference EIs 1014 and reference disparity maps 1015 are provided to MR-DIBR decoder 1017 for further decoding. Reference locations 1013 and luminance weights 1016 (which may be the same as reference locations 1006 and luminance weights 1009, respectively) included in light field encoded data 1011 may also be extracted to provide to MR-DIBR decoder 1017 for decoding. In one embodiment, MR-MR decoder 1017 may perform the MR-DIBR algorithm, as previously described with respect to FIG. 8, and for brevity sake, is not described again. Using reference locations 1013, reference EIs 1014, reference disparity maps 1015, and luminance weights 1016, MR-DIBR decoder 1017 may decode reference EIs 1014 and reference disparity maps 1015 so as to generate output decoded light field images 1018, where decoded light field images 1018 may be modulated by a light field display system (e.g., light field display system 211 of FIG. 2).

In one embodiment, decoded light field images 1018 and input light field images 1002 may be communicated to PSNR calculator 1003 to compute the PSNR (e.g., the overall system distortion) by comparing the decoded light field images 1018 to the original input light field images 1002. That is, decoded light field images 1018 and input light field images 1002 may be used in PSNR and structural similarity index (SSIM) calculations for determining objective image quality performance of MR-DIBR encoder 1005 and MR-DIBR decoder 1017. For example, PSNR calculator 1003 may calculate the PSNR by taking a ratio between the original data from input light field images 1002 and the error (or noise) introduced by the compressions, which may be obtained from decoded light field images 1018. The PSNR produced from PSNR calculator 1003 may be included in evaluation results 1004 for subsequent evaluation of the performance of the overall system. Performance of the overall system for example can be measured by the overall bit rate and distortion, which can be used to improve bit rate allocation among different components.

In one embodiment, MR-DIBR decoder 1017 in decoding stage 1060 may utilize integer disparity values. In some embodiments, use of integer disparity values is advantageous when the target destination is a light field display because each pixel in the light field image is associated with a specific direction. However, in some embodiments, the use of integer disparity can be changed to fractional disparity if the target destination is not a light field display. Going to fractional disparity in the decoding stage 1060 improves the PSNR in the image slightly without causing too much extra burden on the computational load of the system.

Figure 12:
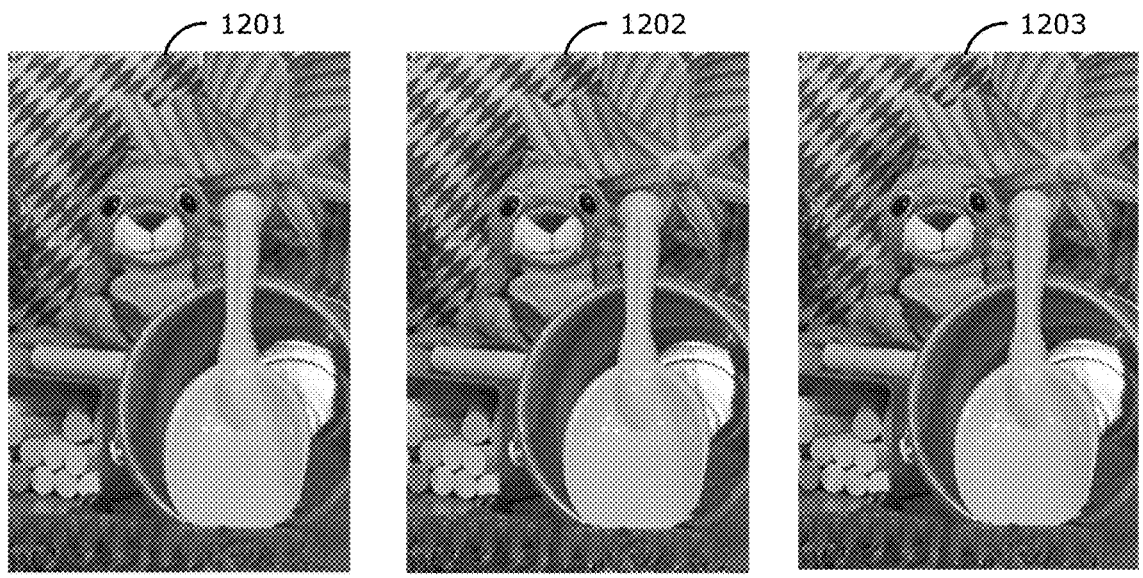
FIG. 12 is a diagram illustrating the subjective performance of a light field compression system as compared to a conventional compression system.

FIG. 12 is a diagram illustrating the subjective performance of the light field compression system (or codec) 1000 as compared to a conventional compression system. In FIG. 12, image 1202 is the original image which may be from a high density camera array (HDCA) dataset. Image 1202 was encoded, for example at 0.0025 bpp, and decoded using the light field compression system 1000 and a conventional compression system (e.g., anchor codec). As shown, image 1201 is the result from using the conventional compression system and image 1203 is the result from using the light field compression system 1000. As further shown, image 1203 was able to preserve the spatial resolution of image 1202 (the original image) while image 1201 includes blurs in the details of the image. This is an important result because the spatial resolution at the elemental image level translates in to the angular resolution in the light field level. Being able to preserve angular resolution at the light field means in addition to the spatial resolution of the light field, the depth of focus of the light field is also preserved. This results in light field data that is more useful at the end of decoding.

Figure 13:
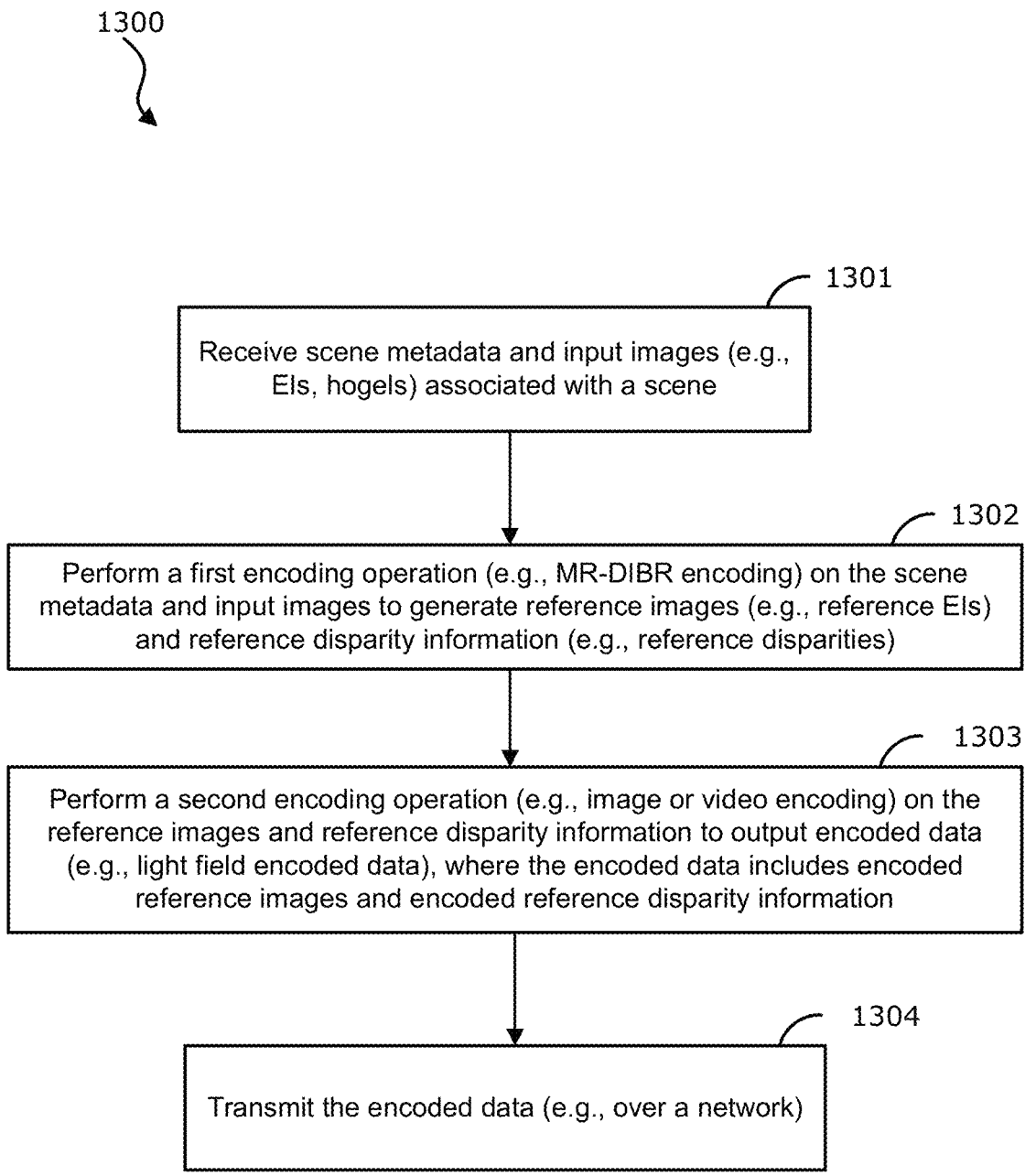
FIG. 13 is a flow diagram illustrating a method of image encoding according to one embodiment.

FIG. 13 is a flow diagram illustrating a method of image encoding according to one embodiment. Method 1300 may be performed by processing logic which may include software, hardware, or a combination thereof. For example, method 1300 may be performed by capturing system 203 of FIG. 2. Referring to FIG. 13, at block 1301, the processing logic receives scene metadata and input images (e.g., EIs, hogels) associated with a scene. At block 1302, the processing logic performs a first encoding operation (e.g., MR-DIBR encoding) on the scene metadata and input images to generate reference images (e.g., reference EIs) and reference disparity information (e.g., reference disparities). At block 1303, the processing logic performs a second encoding operation (e.g., image or video encoding) on the reference images and reference disparity information to output encoded data (e.g., light field encoded data), where the encoded data includes encoded reference images and encoded reference disparity information. At block 1304, the processing logic transmits the encoded data, for example over a network such as network 106.

Figure 14:
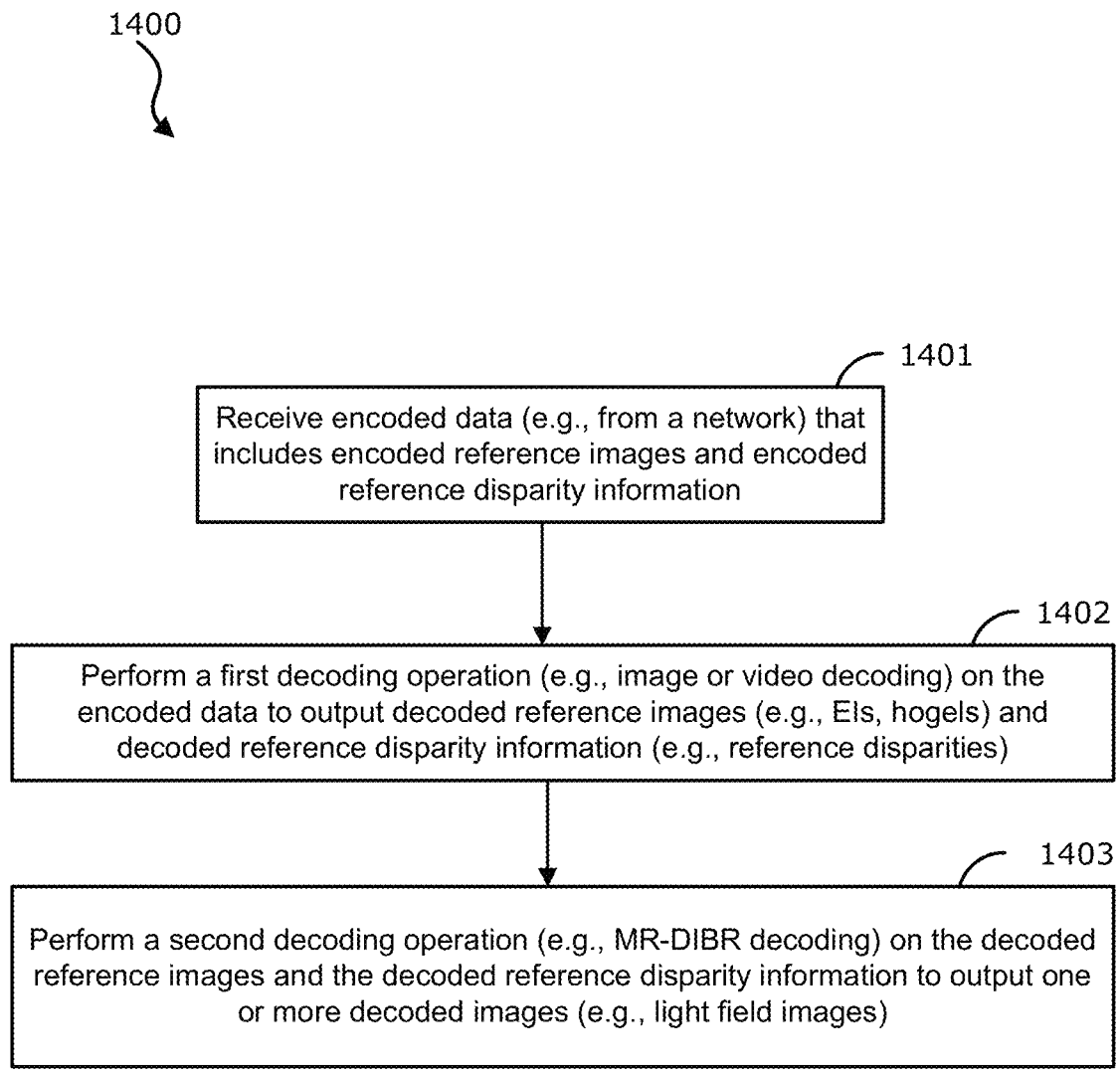
FIG. 14 is a flow diagram illustrating a method of image decoding according to one embodiment.

FIG. 14 is a flow diagram illustrating a method of image decoding according to one embodiment. Method 1400 may be performed by processing logic which may include software, hardware, or a combination thereof. For example, method 1400 may be performed by capturing system 203 and/or light field display system 211 of FIG. 2. Referring to FIG. 14, at block 1401, the processing logic receives encoded data (e.g., from a network such as network 106) that includes encoded reference images and encoded reference disparity information. At block 1402, the processing logic performs a first decoding operation (e.g., image or video decoding) on the encoded data to output decoded reference images (e.g., EIs, hogels) and decoded reference disparity information (e.g., reference disparities). At block 1403, the processing logic performs a second decoding operation (e.g., MR-DIBR decoding) on the decoded reference images and the decoded reference disparity information to output one or more decoded images (e.g., light field images).

Figure 15:
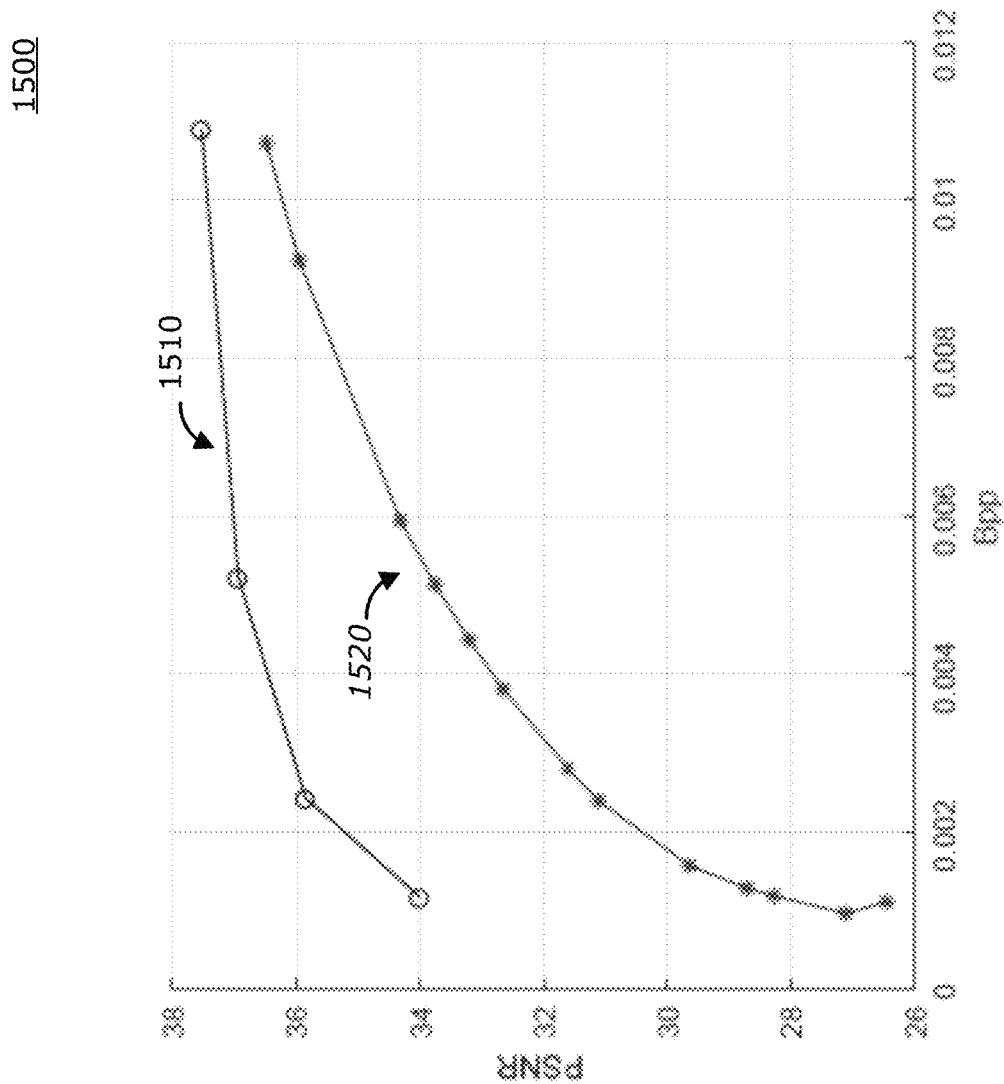
FIG. 15 is a plot illustrating PSNR-bpp relationships of a conventional compression system and a light field compression system according to one embodiment.

FIG. 15 is a plot 1500 illustrating PSNR-bpp relationships of the conventional compression system and the light field compression system 1000. As shown in FIG. 15, curve 1510 represents the PSNR-bpp relationship of the light field compression system 1000 and curve 1520 represents the PSNR-bpp relationship of the conventional compression system. As shown in plot 1500, light field compression system 1000 outperforms the conventional compression system at all bitrates. However, the more significant performance difference occurs at the lowest bitrate, where the light field compression system 1000 outperforms the conventional system by approximately 8 dB. Moreover, at 0.0025 bpp light field compression system 1000 has approximately 4 dB better PSNR than the conventional system.

Figure 16:
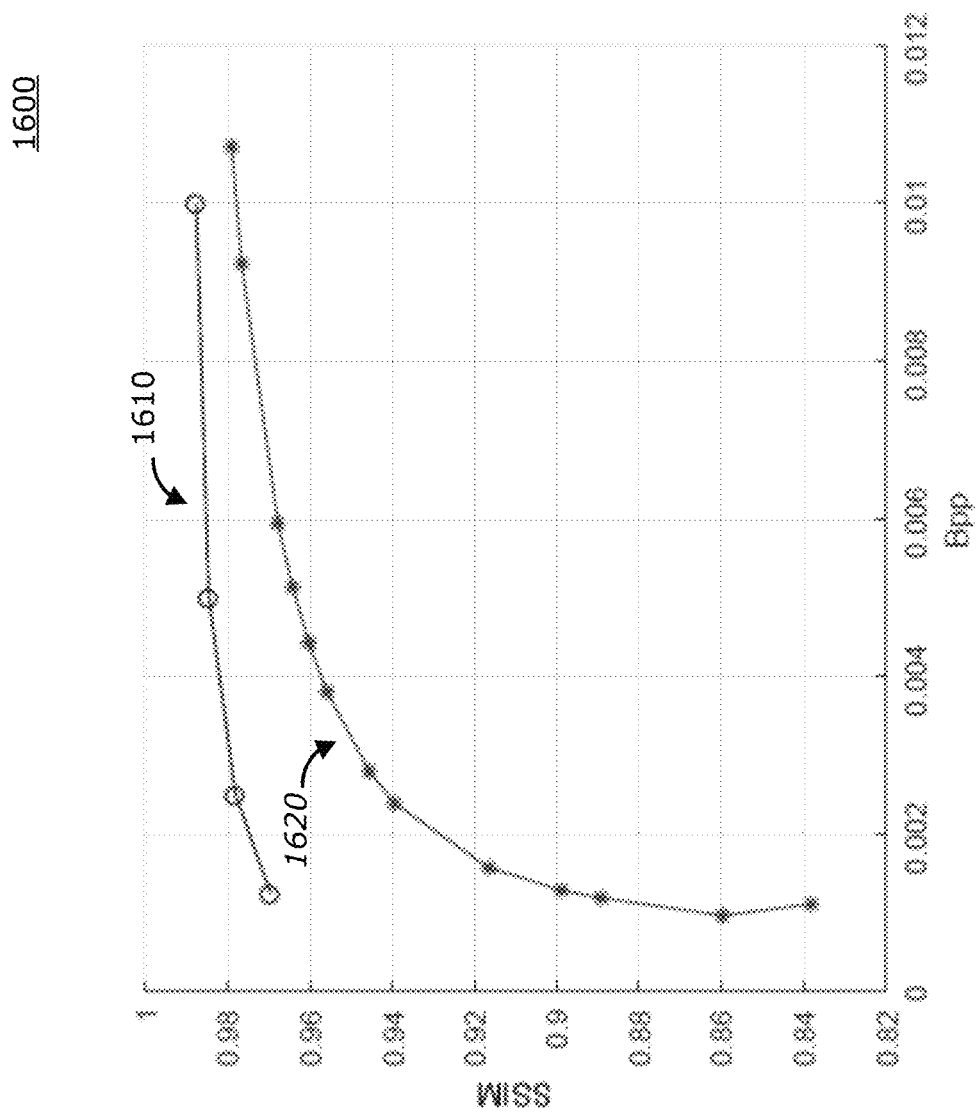
FIG. 16 is a plot illustrating SSIM-bpp relationships of a conventional compression system and a light field compression system according to one embodiment.

FIG. 16 is a plot 1600 illustrating SSIM-bpp relationships of the conventional compression system and the light field compression system 1000 according to one embodiment. In FIG. 16, curve 1610 represents the SSIM-bpp relationship of light field compression system 1000 and curve 1620 represents the SSIM-bpp relationship of the conventional compression system. As shown in plot 1600, light field compression system 1000 again outperforms the conventional compression system at all bitrates. However, the more significant performance difference happens at the lowest bitrate, where light field compression system 1000 outperforms the conventional system by approximately 0.13. In addition, light field compression system 1000 achieves a high performance at the lowest bitrate by performing less computation as compared to the conventional system. Furthermore, at 0.0025 bpp light field compression system 1000 has an SSIM of about 0.04 higher as compared to the conventional system.

The computation speed of both systems are compared on a hardware platform that has a 32-core Intel® Xeon® CPU E5-4627 v2 running at 3.30 GHz with 1 TB memory. Calculations for 0.0025 Bpp with encoding stage 1050 of light field compression system 1000 was finished in about 2 minutes and 20 seconds, while the encoding of the conventional system took about 16 minutes and 30 seconds. Decoding stage 1060 of light field compression system 1000 was finished in about 2 minutes and 54 seconds while the decoding of the conventional system took about 10 minutes and 36 seconds. Accordingly, light field compression system 1000 clearly beats the conventional system in both objective quality measurements and computational speed.

Figure 17:
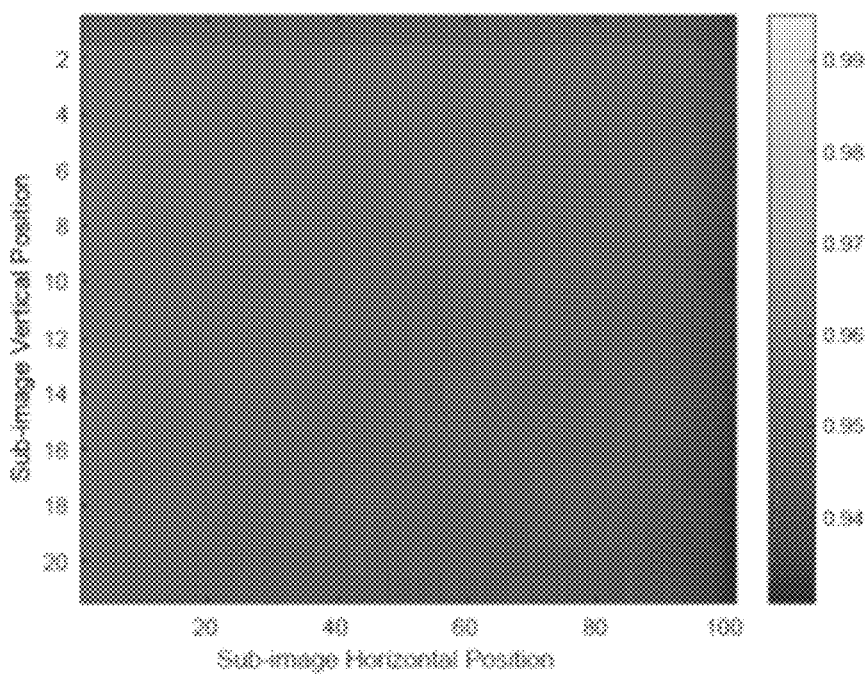
FIG. 17 is a diagram illustrating SSIM values of the conventional compression system.
Figure 18:
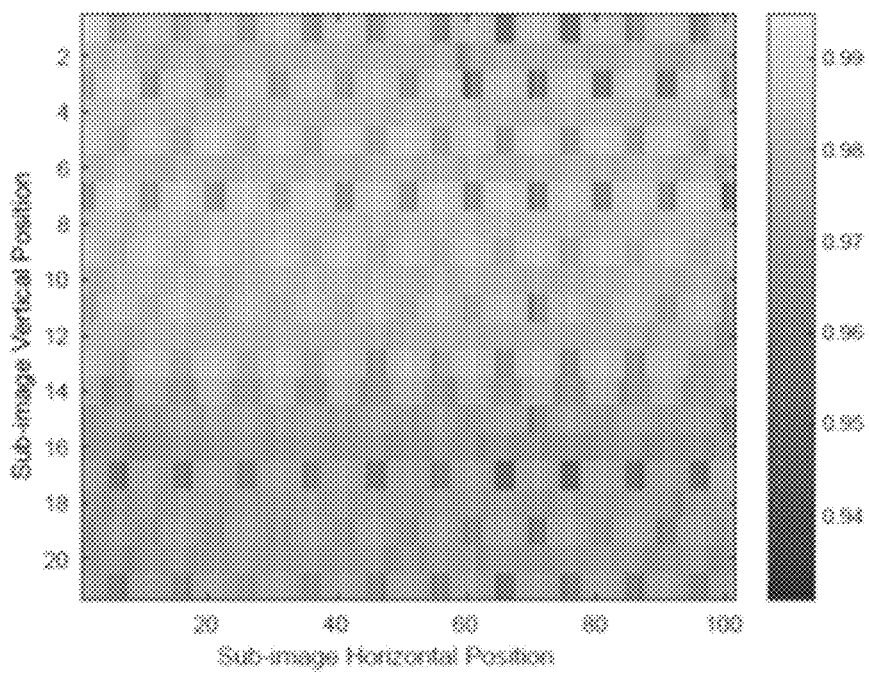
FIG. 18 is a diagram illustrating SSIM values of a light field compression system according to one embodiment.

FIGS. 17-20 illustrate a more detailed objective performance calculation for the full image (or HDCA dataset). As shown in FIG. 17, SSIM values of the conventional compression system (e.g., anchor codec) stay relatively constant across the entire dataset. However, as shown in FIG. 18, light field compression system 1000 has regions with much higher SSIM values, while the lowest SSIM value of light field compression system 1000 is approximately equal to the highest SSIM value of the conventional system. Therefore, light field compression system 1000 has superior performance over the conventional system with respect to SSIM.

Figure 19:
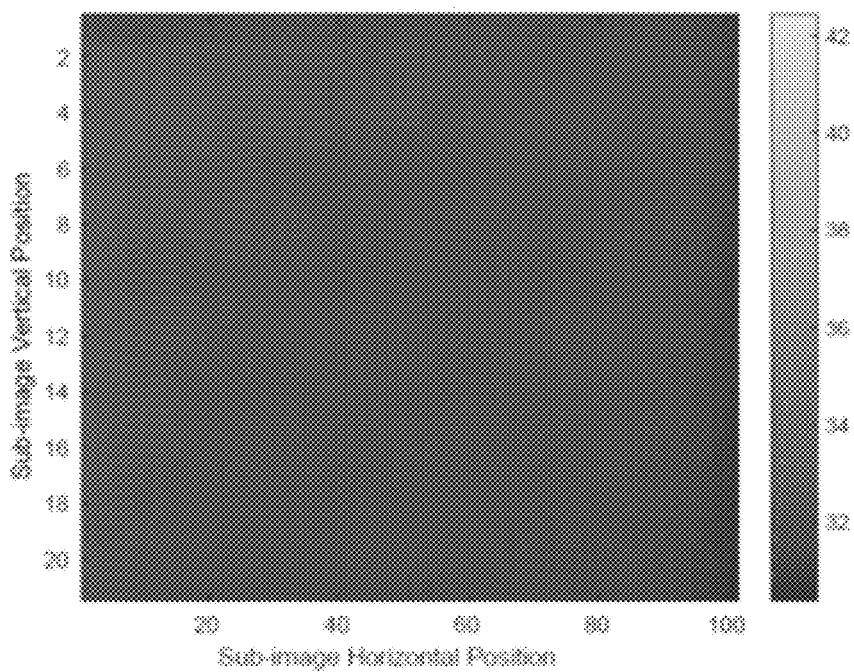
FIG. 19 is a diagram illustrating PSNR values the conventional compression system.
Figure 20:
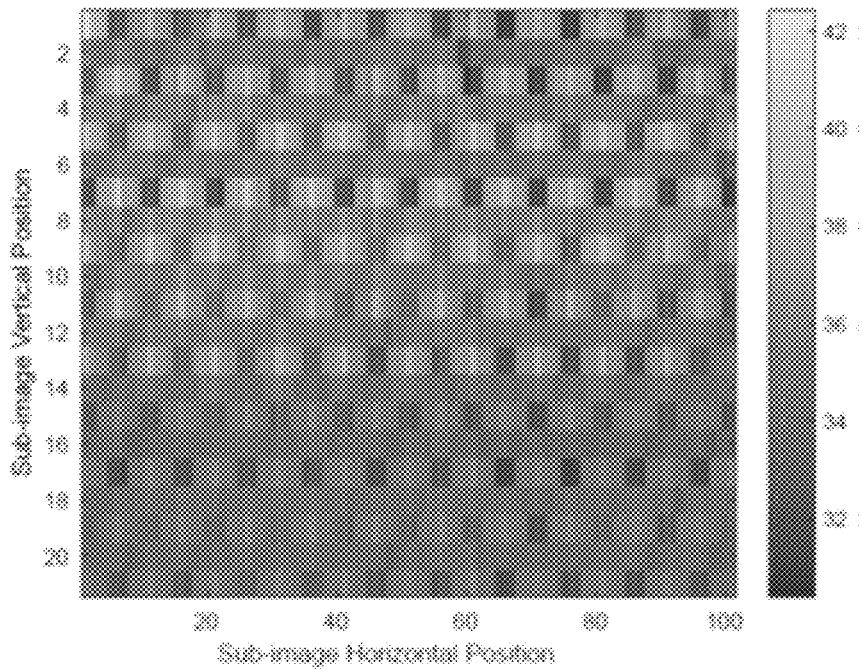
FIG. 20 is a diagram illustrating PSNR values of the light field compression system according to one embodiment.

Turning now to FIGS. 19-20, with reference to FIG. 19, PSNR values of the conventional system also stay relatively constant across the entire image. However, as shown in FIG. 20, light field compression system 1000 has regions with much higher PSNR values, while the lowest PSNR value of light field compression system 1000 is approximately equal to the lowest PSNR value of the conventional system. Therefore, the PSNR of light field compression system 1000 is on average higher than that of the conventional system, while it does not perform any worse than the conventional system at certain regions of the image. Moreover, as shown in FIGS. 18 and 20, performance of light field compression system 1000 peaks in some regions and drops in other regions. The regions with the peaks correspond to the locations of the reference EIs (as previously described). As further shown in FIGS. 18 and 20, the performance of system 1000 may reduce gracefully as the synthesized image moves away from the reference EIs. If further performance improvement is required in the image, additional reference EIs can be inserted in the locations with the lowest performance to increase the overall image quality.

In some embodiments, the system 1000 keeps most of the advantages of a full parallax light field compression framework, for example as disclosed in U.S. Publication No. 2015/0201176. Even though full captured light field is available, system 1000 identifies the minimum number of reference EIs required to synthesize the full light field image. This reduces processing requirements significantly compared to the conventional system, since the encoding operations are applied to a much smaller number of images. Based on the bitrate and quality requirements, the number of reference images can be increased to provide a higher quality. In one embodiment, system 1000 can reach virtually lossless quality without using most of the light field data in its encoding operations. In one embodiment, system 1000 is fully parallelizable in both encoding and decoding stages. In encoding stage 1050, once the reference EIs are identified, their disparity maps can be calculated independently and encoder 1010 can also be parallelized to complete the encoding. In decoding stage 1060, in one embodiment, image synthesis requires the four nearest reference images for each elemental image in the light field. This means a group of four reference elemental images can run independently to synthesize the missing elemental images in a region, facilitating very fast computation speeds.

In some embodiments, system 1000 may be utilized for Joint Photographic Experts group (JPEG) Pleno standard. Due to the JPEG Pleno requirements, the minimum bit rate was set at 0.00125 bpp. However, the system 1000 actually has headroom to perform at lower bitrates while maintaining good quality. It is difficult for a codec, such as HEVC, to compress 2100 images in an HDCA light field to a very small bitrate without significant amount of calculation. However, to achieve the smallest bit rate, the system 1000 uses the minimum set of reference EIs. This results in a significantly lower computational requirement for achieving the lowest bit rate, providing a significant advantage to system 1000.

In some embodiments, system 1000 may support Lytro and HDCA representation models. It can also support other representation models either directly (such as 3D mesh models, gigapixel light field images, etc.) or through a conversion (such as point cloud to mesh conversion) to the readily supported representation models.

In some embodiments, system 1000 is color representation agnostic. In some embodiments, system 1000 does not have any restrictions being backward compatible with JPEG. The display-matched encoding stage to compress the reference EIs 1007 and disparity maps 1008 (i.e., encoder 1010) can be made backward compatible with JPEG. In some embodiments, system 1000 does not have any restrictions being forward compatible with JPEG. The display-matched encoding stage to compress the reference EIs 1007 and disparity maps 1008 can be made forward compatible with JPEG. As previously described, in some embodiments, system 1000 can compress the data further than the conventional system. At the same compression efficiency, system 1000 beats the conventional system in terms of PSNR and SSIM. For example, system 1000 has up to 8 dB PSNR advantage at the lowest bit rates as compared to the conventional system.

In some embodiments, one of the biggest advantages of system 1000 is in the low computational complexity it offers. Exploiting the similarities in a full parallax light field, system 1000 uses the scene information to choose the minimum set of images to reconstruct the full light field. The processing requirements for choosing the reference images are minimal. From this point on, if lower image quality but higher compression efficiency is desired, the computational requirements remain low. If lower compression efficiency but higher image quality is desired computational requirements increase. For HDCA dataset @ 0.0025 bpp scenario, for example, encoding stage 1050 was 6.6× faster than the conventional encoder, while decoding stage 1060 for the same data and data rate was 3.7× faster than the conventional decoder.

Due to the nature of system 1000, random access is very easy. If a requested view is available as a reference image than that view can be accessed immediately. If the view is not available then it can be reconstructed by using the closest four reference images to it. This capability of system 1000 can be further tuned to access specific views or parts of image or even varying resolutions.

As previously described, system 1000 provides scalability in terms of quality, for example SNR, computational complexity, and content (or object). In addition, system 1000 is excellent in preserving the light field image angular resolution. Angular resolution refers to a measure of the quality of the light field image. Angular resolution for a light field image is analogous to pixel resolution in a 2D image. The higher the angular resolution the better quality the light field data in terms of spatial, depth and spectral resolutions. For example, the reconstructed light field image from decoding stage 1060 has excellent spatial, depth and spectral resolution, while preserving the number of viewing angles and viewing angle range. Since system 1000 preserves the angular resolution, it is possible to create reconstructions of the data either at full angular resolution or at lower angular resolutions.

In some embodiments, system 1000 allows for easier editing or manipulation of the compressed light field image. Because most of the editing or manipulation operations can be done at the reference image level, system 1000 provides savings in computational complexity and task completion speed.

In some embodiments, system 1000's error resilience was proven with HDCA dataset results. For example, it was found that an image, at location 100_000, had an error and did not follow the same horizontal parallax pattern as other images on the same row. At the end of the compression, system 1000 actually corrected the image at location at 100_000 and created a better light field image.

In some embodiments, system 1000 is very error resilient because the MR-DIBR encoder 1005 and MR-DIBR decoder 1017 can cope with missing reference images and reference depth maps by using other nearby reference images or disparity maps. If a part of the reference image or reference depth map is missing, it can be reconstructed using MR-DIBR method also.

In some embodiments, in the cases of high bitrate, the resulting error due to missing packets or bits should be imperceptible to the user, since there would be enough redundancy in the number of reference images and reference depth maps to eliminate the error. In the cases of lowest possible bit rates, the number of reference reduces and each image becomes more important for the image. But even then, as long as at least one reference image and its corresponding disparity map are available the whole image should be reconstructable.

In some embodiments, system 1000 is designed to run real-time encoding and decoding of giga-pixel full parallax light field images to display on full parallax light field displays. System 1000 can easily be parallelized on parallel processors and requires only as much memory to hold the reference images and reference disparity maps for encoding and decoding operations. Specialized hardware and software are designed for enabling real-time operation with very low power consumption.

In some embodiments, a capturing system (e.g., capturing system 203 of FIG. 2) can even be part of an imaging system and capture only the required reference images and reference depth maps instead of capturing the entire data in order to reduce processing, memory, and power consumption requirements.

In some embodiments, system 1000 requires metadata in both encoding and decoding stages. The coding of this metadata, in one embodiment, can be handled using existing JPEG standards.

In some embodiments, system 1000 does not have any restrictions in supporting privacy and security needs of the associated content.

In some embodiments, system 1000 is designed to run on a distributed and parallel processing environment, therefore it fully supports parallelization.

In some embodiments, performance parameters of system 1000 can be adjusted to run on low latency and real time environments. Both the encoding process and the decoding process can be customized for specific computing and display hardware requirements to achieve real time performance.

In some embodiments, system 1000 facilitates hierarchical data processing by enabling decoding of the data in multiple steps. Hierarchical processing is an important requirement for display and decoding of the information because it allows each processing node to decode the data in multiple stages and reduces the burden on the communication link.

In one embodiment, to perform hierarchical data processing, each node may decode the reference images and reference disparity maps of the downstream processing node until the data is fully decoded.

In some embodiments, system 1000 is designed to support sharing of the data between multiple display elements or sub-displays in the system. One way to achieve this is through hierarchical decoding of the compressed light field data.

In one embodiment, in a tiled display, multiple sub-displays (or tiles) can shares the same reference images and reference disparity maps. In this case the reference data can be transferred laterally rather than hierarchically to enable memory savings in the system.

In some embodiments, system 1000 preserves the spatial and angular resolution in the light field image. It can work with multiple color/spectral components and it can also support six (6) degrees of freedom that is available in a full parallax light field image.

In some embodiments, system 1000 can decode images further in display-matched encoding stage which creates a display dependent representation of the compressed light filed data. Display-matched encoding stage, in one embodiment, can be replaced by a standard display agnostic encoding method to create a display independent or universal representation.

In some embodiments, system 1000 may support calibration metadata in the imaging pipeline. For example, system 1000 may make use of the calibration data both at the capture stage and/or decoding stage depending on the requirements of the system. If the calibration data is required to be used in the encoding stage (i.e. for a camera) the reference images and reference disparity maps can be calibrated at the encoding stage. If the calibration data is required to be used in the decoding stage (i.e. for a display), the correct position for the decoded data on the modulation surface can be calculated using this data.

In some embodiments, system 1000 does not have any restrictions in supporting synchronization of data captured by different sensors.

In some embodiments, system 1000 supports microlens arrays on sensors (e.g., light field cameras), linear array (e.g., HDCA data), non-linear array and rotating sensor type configurations.

In some embodiments, in the case of rotating sensor type configurations, without any overlap in field of view (FOV) of the sensor, each rotation is treated independently in finding the reference images and disparity maps. On the other hand, with overlap in FOV of the sensor, the overlapping rotations are treated simultaneously in finding the reference images and disparity maps.

In some embodiments, in the case of non-linear array type configurations, the camera placement and the scene is analyzed to find the smallest number of reference images and disparity maps.

In some embodiments, system 1000 requires that the compressed data includes reference images and their corresponding disparity maps. Therefore, the algorithm would support supplemental depth maps.

In various embodiments, system 1000 can address all the desired bitrates and performance requirements while operating with a much higher computational speed and lower number of operations as compared to the conventional system (e.g., anchor codec). This, therefore, would result in savings in power consumption, which is very important in today's mobile electronics, such as cell phones and mixed reality devices.

Figure 21:
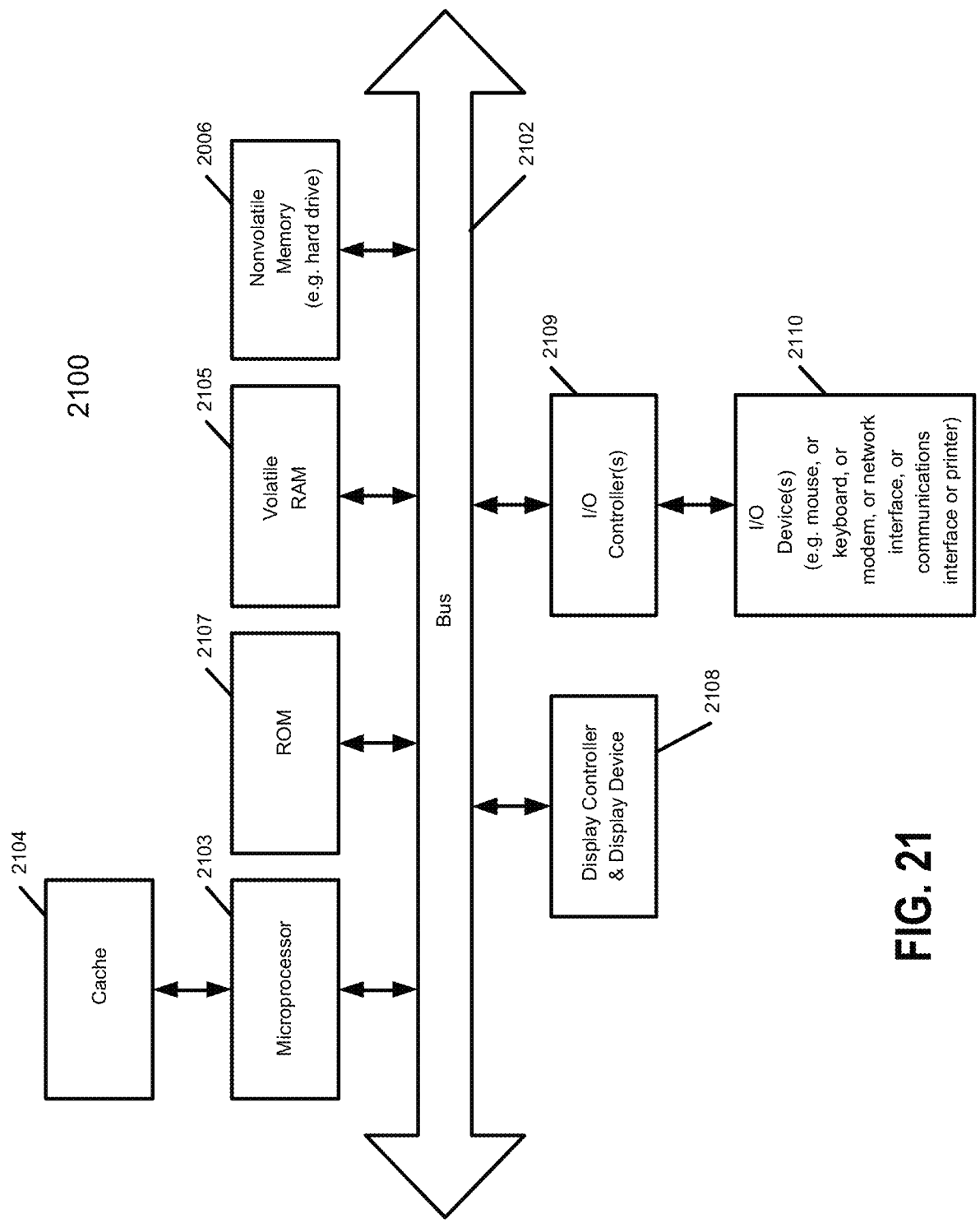
FIG. 21 is a block diagram of a data processing system according to one embodiment.

FIG. 21 is a block diagram of a data processing system, which may be used with one embodiment of the invention. For example, the system 2100 may be used as part of capturing system 203 and/or light field display system 211, as shown in FIG. 2, to implement the various systems (e.g., system 1000) and methods (e.g., methods of FIGS. 3-4 and methods 1300-1400) as previously described. Note that while FIG. 21 illustrates various components of a computer system, it is not intended to represent any particular architecture or manner of interconnecting the components, as such details are not germane to the invention. It will also be appreciated that network computers, handheld computers, mobile devices (e.g., smartphones, tablets) and other data processing systems which have fewer components or perhaps more components may also be used with the invention.

As shown in FIG. 21, the system 2100, which is a form of a data processing system, includes a bus or interconnect 2102 which is coupled to one or more microprocessors 2103 and a ROM 2107, a volatile RAM 2105, and a non-volatile memory 2106. The microprocessor 2103 is coupled to cache memory 2104. The bus 2102 interconnects these various components together and also interconnects these components 2103, 2107, 2105, and 2106 to a display controller and display device 2108, as well as to input/output (I/O) devices 2110, which may be mice, keyboards, modems, network interfaces, printers, and other devices which are well-known in the art.

Typically, the input/output devices 2110 are coupled to the system through input/output controllers 2109. The volatile RAM 2105 is typically implemented as dynamic RAM (DRAM) which requires power continuously in order to refresh or maintain the data in the memory. The non-volatile memory 2106 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 21 shows that the non-volatile memory is a local device coupled directly to the rest of the components in the data processing system, a non-volatile memory that is remote from the system may be utilized, such as, a network storage device which is coupled to the data processing system through a network interface such as a modem or Ethernet interface. The bus 2102 may include one or more buses connected to each other through various bridges, controllers, and/or adapters, as is well-known in the art. In one embodiment, the I/O controller 2109 includes a Universal Serial Bus (USB) adapter for controlling USB peripherals. Alternatively, I/O controller 2109 may include an IEEE-1394 adapter, also known as FireWire adapter, for controlling FireWire devices.

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of image encoding, comprising:
   receiving scene metadata and input images associated with a scene;
   performing a first encoding operation on the scene metadata and input images to generate reference images and reference disparity information, comprising:
   selecting a subset of the input images as the reference images;
   estimating one or more disparity maps for each of the selected images to produce the reference disparity information; and
   generating reference locations and luminance weights associated with the reference images; and
   performing a second encoding operation on the reference images and reference disparity information to output encoded data, wherein the encoded data includes the encoded reference images, the encoded reference disparity information, the reference locations and the associated luminance weights; and
   transmitting the encoded data.

2. The method of claim 1, wherein generating reference locations comprises:
   determining a reference location in each of the selected images to produce the reference locations, and
   wherein generating luminance weights associated with the reference images comprises determining a local luminance level for each of the selected images as compared to a global light field luminance level to produce the luminance weights.

3. The method of claim 1, wherein prior to performing the second encoding operation on the reference images and reference disparity information,
   determining a first bit budget of a total bit budget for the reference images and a second bit budget of the total bit budget for the reference disparity information.

4. The method of claim 3, wherein the first bit budget is within a range of 80-85% of the total bit budget, and the second bit budget is within a range of 15-20% of the total bit budget.

5. The method of claim 4, wherein performing the second encoding operation on the reference images and reference disparity information is based on the first and second bit budgets.

6. The method of claim 1, wherein the first encoding operation is based on multiple-reference depth image-based rendering (MR-DIBR), and the second encoding operation is based on an image or video encoding standard.

7. The method of claim 1, wherein the generated reference images include at least four (4) reference images, and the generated reference disparity information includes at least four (4) reference disparities.

8. The method of claim 1, wherein the scene metadata comprises:
   (i) optical characteristics of a capturing device, and
   (ii) captured data from the capturing device including one or more of camera pixel count, camera location(s), lens field of view (FOV), scene composition, scene distance from the camera(s), and display device characteristics.

9. A computer-implemented method of image encoding, comprising:
   receiving scene metadata and input images associated with a scene;
   performing a first encoding operation on the scene metadata and input images to generate reference images and reference disparity information, comprising:
   selecting a subset of the input images as the reference images;
   estimating one or more disparity maps for each of the selected images to produce the reference disparity information;
   generating reference locations and luminance weights associated with the reference images; and
   determining bits per pixel (bpp) configurations that include reference selection adjustment, texture versus disparity map weights, or on/off luminance scaling;
   performing a second encoding operation on the reference images and reference disparity information to output encoded data, based on the determined bpp configurations, wherein the encoded data includes the encoded reference images, the encoded reference disparity information, the reference locations and the associated luminance weights; and transmitting the encoded data.

10. A computer-implemented method of image decoding, comprising:

receiving encoded data including encoded reference images, encoded reference disparity information, reference locations and luminance weights associated with the encoded reference images;

performing a first decoding operation on the encoded data to output decoded reference images and decoded reference disparity information; and performing a second decoding operation on the decoded reference images, the decoded reference disparity information, the reference locations, and the luminance weights to output one or more decoded images.

11. The method of claim 10, wherein performing the second decoding operation on the decoded reference images and the decoded reference disparity information comprises:

forward warping each reference disparity from the decoded reference disparity information to produce a plurality of forward warped reference disparities, filtering each of the forward warped reference disparities to generate a plurality of filtered reference disparities, merging the plurality of filtered reference disparities into a merged reference disparity, and backward warping, using the merged reference disparity and the decoded reference images, to produce the one or more decoded images.

12. The method of claim 10, wherein the first decoding operation is based on an image or video decoding standard, and the second decoding operation is based on multiple-reference depth image-based rendering (MR-DIBR).

13. The method of claim 10, further comprising:

computing a peak signal-to-noise ratio (PSNR) by comparing the one or more decoded images to input images of a scene to determine objective image quality performance of the second decoding operation.

14. The method of claim 10, wherein the second decoding operation uses integer disparity values.

15. The method of claim 10, wherein the one or more decoded images include light field images.

16. The method of claim 15, wherein the reference images include elemental images (EIs).

17. The method of claim 11, wherein the decoded reference images include at least four (4) reference images, and the decoded reference disparity information includes at least four (4) reference disparities.

* * * * *